(12) United States Patent
Xiao et al.

(10) Patent No.: US 12,317,260 B2
(45) Date of Patent: May 27, 2025

(54) COMMUNICATION METHOD AND APPARATUS

(71) Applicant: Huawei Technologies Co., Ltd., Shenzhen (CN)

(72) Inventors: Jiehua Xiao, Shenzhen (CN); Xinxian Li, Shanghai (CN); Jinlin Peng, Shanghai (CN); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 345 days.

(21) Appl. No.: 17/664,326

(22) Filed: May 20, 2022

(65) Prior Publication Data
US 2022/0279555 A1  Sep. 1, 2022

Related U.S. Application Data

(63) Continuation of application No. PCT/CN2019/120337, filed on Nov. 22, 2019.

(51) Int. Cl.
*H04W 72/1273* (2023.01)
*H04W 24/08* (2009.01)
(Continued)

(52) U.S. Cl.
CPC ....... *H04W 72/1273* (2013.01); *H04W 24/08* (2013.01); *H04W 72/0446* (2013.01); *H04W 72/23* (2023.01)

(58) Field of Classification Search
CPC ............. H04W 72/1273; H04W 24/08; H04W 72/0446; H04W 72/23; H04L 5/0094; H04L 5/0053
See application file for complete search history.

(56) References Cited

U.S. PATENT DOCUMENTS

2019/0149365 A1* 5/2019 Chatterjee ........... H04L 25/0226
                                                    370/329
2019/0254053 A1* 8/2019 Ying ........................ H04L 5/00

FOREIGN PATENT DOCUMENTS

CN    105589506 A    5/2016
CN    107659994 A    2/2018
(Continued)

OTHER PUBLICATIONS

VIVO, "PDCCH enhancements for URLLC", 3GPP TSG RAN WG1 #98bis, R1-1910221, Chongqing, China, Oct. 14-20, 2019, 8 pages.
(Continued)

*Primary Examiner* — Dady Chery
(74) *Attorney, Agent, or Firm* — Slater Matsil, LLP

(57) ABSTRACT

This application relates to the field of communication technologies, and provides a communication method and apparatus. The method includes: A terminal device receives first downlink control information DCI from a network device through a first physical downlink control channel PDCCH. The first DCI includes a first time domain resource assignment TDRA indicator field, and the first TDRA indicator field is used to indicate a first time domain resource. The terminal device receives or sends data on a second time domain resource after determining the second time domain resource based on a time domain position of the first PDCCH and the first time domain resource. The first time domain resource is different from the second time domain resource. The method is applied to a time domain resource assignment process of the data scheduling.

20 Claims, 12 Drawing Sheets

(51) Int. Cl.
  *H04W 72/0446*  (2023.01)
  *H04W 72/23*  (2023.01)

(56) References Cited

FOREIGN PATENT DOCUMENTS

| | | |
|---|---|---|
| CN | 110351851 A | 10/2019 |
| EP | 3734878 A1 | 11/2020 |
| WO | 2019138912 A1 | 7/2019 |
| WO | 2019144932 A1 | 8/2019 |
| WO | 2019157912 A1 | 8/2019 |

OTHER PUBLICATIONS

3rd Generation Partnership Project; Technical Specification Group Radio Access Network; NR; Multiplexing and channel coding (Release 15), 3GPP TS 38.212 V15.7.0 (Sep. 2019), 101 pages.
OPPO, "On Cross-carrier Scheduling with Different Numerologies", 3GPP TSG RAN WG1 #96bis, R1-1904041, Xian, China, Apr. 8-12, 2019, 3 pages.
3rd Generation Partnership Project; Technical Specification Group Radio Access Network; NR; Physical layer procedures for control (Release 15), 3GPP TS 38.213 V15.7.0 (Sep. 2019), 108 pages.
3rd Generation Partnership Project; Technical Specification Group Radio Access Network; NR; Physical layer procedures for data (Release 15), 3GPP TS 38.214 V15.7.0 (Sep. 2019), 106 pages.
3rd Generation Partnership Project; Technical Specification Group Radio Access Network; NR; Radio Resource Control (RRC) protocol specification (Release 15), 3GPP TS 38.331 V15.7.0 (Sep. 2019), 527 pages.

\* cited by examiner

| R | Identifier of a serving cell | | | | | | Identifier of a BWP | | Oct 1 |
|---|---|---|---|---|---|---|---|---|---|
| SS 7 | SS 6 | SS 5 | SS 4 | SS 3 | SS 2 | SS 1 | | SS 0 | Oct 2 |
| R | R | R | R | R | R | SS 9 | | SS 8 | Oct 3 |

COMMUNICATION METHOD AND APPARATUS

CROSS-REFERENCE TO RELATED APPLICATIONS

This application is a continuation of International Application No. PCT/CN2019/120337, filed on Nov. 22, 2019, the disclosure of which is hereby incorporated by reference in its entirety.

TECHNICAL FIELD

This application relates to the field of communication technologies, and in particular, to a communication method and apparatus.

BACKGROUND

A time domain resource for dynamic data scheduling is determined based on both a time domain resource assignment table configured by a network device using radio resource control (RRC) signaling and a time domain resource assignment (TDRA) indicator field in downlink control information (DCI) carried on a physical downlink control channel (PDCCH). However, a time domain position of the PDCCH may dynamically change, which affects the time domain resource for the data scheduling. Therefore, how to reduce, when the time domain position of the PDCCH dynamically changes, impact on the time domain resource for the data scheduling becomes an urgent problem to be resolved.

SUMMARY

Embodiments of this application provide a communication method and apparatus, to allocate a time domain resource for data scheduling when a time domain position of a PDCCH dynamically changes.

To achieve the foregoing objective, the following technical solutions are used in embodiments of this application.

According to a first aspect, an embodiment of this application provides a communication method. The communication method may be performed by a terminal device, or may be performed by a component (for example, a processor, a chip, or a chip system) of the terminal device. The method includes: receiving first downlink control information DCI from a network device through a first physical downlink control channel PDCCH, where the first DCI includes a first time domain resource assignment TDRA indicator field, and the first TDRA indicator field is used to indicate a first time domain resource; and receiving or sending data on a second time domain resource after determining the second time domain resource based on a time domain position of the first PDCCH and the first time domain resource, where the first time domain resource is different from the second time domain resource.

In the communication method in this embodiment of this application, the second time domain resource used for data scheduling is determined based on the time domain position of the first PDCCH and the first time domain resource, and is different from the first time domain resource. Even if the time domain position of the first PDCCH does not satisfy a time domain resource used for dynamic data scheduling, for example, the time domain position of the first PDCCH overlaps the first time domain resource, the terminal device can determine, based on the time domain position of the first PDCCH and the first time domain resource, the second time domain resource used for the data scheduling, to implement flexible matching of a scheduling resource.

In a possible design, the determining the second time domain resource based on a time domain position of the first PDCCH and the first time domain resource includes: determining the second time domain resource based on an end symbol position of the first PDCCH when the end symbol position of the first PDCCH overlaps the first time domain resource. In this way, when the end symbol position of the first PDCCH overlaps the first time domain resource, the first time domain resource cannot be used for the data scheduling. The terminal device determines, based on the end symbol position of the first PDCCH, the second time domain resource used for the data scheduling, for example, determines, based on the end symbol position of the first PDCCH, a start symbol position and an allocation length that are of the second time domain resource, to implement the flexible matching of the scheduling resource.

In a possible design, there is an offset between a start symbol position of the second time domain resource and the end symbol position of the first PDCCH. In other words, the time domain resource for the data scheduling does not conflict with the time domain position of the first PDCCH. This can ensure data transmission, and help improve data transmission performance.

In a possible design, a unit of a value of the offset is a symbol, and the value of the offset is an integer greater than zero.

In a possible design, an allocation length of the second time domain resource is less than or equal to an allocation length of the first time domain resource. In other words, the terminal device still determines the allocation length of the second time domain resource based on the allocation length of the first time domain resource. In this way, the time domain resource for the data scheduling does not conflict with the time domain position of the first PDCCH, so that data transmission performance is improved.

In a possible design, the communication method provided in this embodiment of this application further includes: receiving first indication information from the network device; and the determining the second time domain resource based on a time domain position of the first PDCCH and the first time domain resource includes: determining the second time domain resource based on the first indication information, the time domain position of the first PDCCH, and the first time domain resource. In other words, the first indication information can directly indicate the terminal device to determine the second time domain resource based on the time domain position of the first PDCCH and the first time domain resource, or whether the first indication information exists indicates whether the terminal device determines the second time domain resource based on the time domain position of the first PDCCH and the first time domain resource.

In a possible design, the communication method provided in this embodiment of this application further includes: receiving first configuration information from the network device, where the first configuration information is used to configure a plurality of search spaces; and receiving second indication information from the network device, where the second indication information indicates at least one search space in the plurality of search spaces; and the receiving first DCI from a network device through a first PDCCH includes: receiving the first DCI from the network device through the first PDCCH in the at least one search space.

In this way, when the plurality of search spaces are configured, the terminal device receives the first DCI through the first PDCCH in the at least one search space indicated by the second indication information, to reduce a quantity of times the terminal device blindly detects the first PDCCH.

In a possible design, the second indication information further indicates information about a serving cell and/or information about a bandwidth part BWP. In other words, in a case of cell self-scheduling, both a scheduling cell and a scheduled cell are cells in which the second indication information is sent. The second indication information further indicates the information about the BWP. The terminal device sends and receives, based on the second indication information indicating the information about the BWP, data in a BWP in a cell in which the second indication information is sent. In a case of cross-cell scheduling, the second indication information further indicates the information about the serving cell. The terminal device sends and receives, based on the second indication information indicating the information about the serving cell, data in a BWP in the serving cell indicated by the second indication information. In the case of cross-cell scheduling, the second indication information may indicate the information about the BWP. In other words, the terminal device sends and receives data in the serving cell and the BWP that are indicated by the second indication information. The second indication information may alternatively not indicate the information about the BWP. The terminal device and the network device determine, by default, which BWPs are active BWPs. In other words, the terminal device sends and receives data in the serving cell indicated by the second indication information and the BWPs that are active by default.

According to a second aspect, an embodiment of this application provides a communication method. The communication method may be performed by a terminal device, or may be performed by a component (for example, a processor, a chip, or a chip system) of the terminal device. The method includes: receiving second downlink control information DCI from a network device through a second physical downlink control channel PDCCH, where the second DCI includes a second time domain resource assignment TDRA indicator field, and a value indicated by the second TDRA indicator field corresponds to a plurality of third time domain resources; and receiving or sending data on a fourth time domain resource after obtaining the fourth time domain resource, where there is a correspondence between the fourth time domain resource and a time domain position of the second PDCCH, and the fourth time domain resource is one of the plurality of third time domain resources.

In the communication method in this embodiment of this application, the value indicated by the second TDRA indicator field corresponds to the plurality of third time domain resources instead of one third time domain resource. Even if the time domain position of the second PDCCH does not satisfy a time domain resource used for dynamic data scheduling, for example, the time domain position of the second PDCCH overlaps one of the plurality of third time domain resources, the terminal device can determine, based on the time domain position of the second PDCCH, the fourth time domain resource used for the data scheduling, to improve flexible matching of a scheduling resource.

In a possible design, the communication method provided in this embodiment of this application further includes: receiving third indication information from the network device; and the obtaining the fourth time domain resource includes: obtaining, based on the third indication information and the time domain position of the second PDCCH, the fourth time domain resource indicated by the second TDRA indicator field. In other words, the third indication information can directly indicate the terminal device to determine the fourth time domain resource based on the time domain position of the second PDCCH, or whether the third indication information exists indicates whether the terminal device determines the fourth time domain resource based on the time domain position of the second PDCCH.

In a possible design, the communication method provided in this embodiment of this application further includes: receiving second configuration information from the network device, where the second configuration information is used to configure a plurality of search spaces; and receiving fourth indication information from the network device, where the fourth indication information indicates at least one search space in the plurality of search spaces; and the receiving second DCI from a network device through a second PDCCH includes: receiving the second DCI from the network device through the second PDCCH in the at least one search space. In this way, when the plurality of search spaces are configured, the terminal device receives the second DCI through the second PDCCH in the at least one search space indicated by the fourth indication information, to reduce a quantity of times the terminal device blindly detects the second PDCCH.

In a possible design, the fourth indication information further indicates information about a serving cell and/or information about a bandwidth part BWP. In other words, in a case of cell self-scheduling, both a scheduling cell and a scheduled cell are cells in which the fourth indication information is sent. The fourth indication information further indicates the information about the BWP. The terminal device sends and receives, based on the fourth indication information indicating the information about the BWP, data in a BWP in a cell in which the fourth indication information is sent. In a case of cross-cell scheduling, the fourth indication information further indicates the information about the serving cell. The terminal device sends and receives, based on the fourth indication information indicating the information about the serving cell, data in a BWP in the serving cell indicated by the fourth indication information. In the case of cross-cell scheduling, the fourth indication information may indicate the information about the BWP. In other words, the terminal device sends and receives data in the serving cell and the BWP that are indicated by the fourth indication information. The fourth indication information may alternatively not indicate the information about the BWP. The terminal device and the network device determine, by default, which BWPs are active BWPs. In other words, the terminal device sends and receives data in the serving cell indicated by the fourth indication information and the BWPs that are active by default.

According to a third aspect, an embodiment of this application provides a communication method. The communication method may be performed by a network device, or may be performed by a component (for example, a processor, a chip, or a chip system) of the network device. The method includes: sending first downlink control information DCI to a terminal device through a first physical downlink control channel PDCCH, where the first DCI includes a first time domain resource assignment TDRA indicator field, the first TDRA indicator field is used to indicate a first time domain resource, a time domain position of the first PDCCH and the first time domain resource are used to determine a second time domain resource, and the first time domain resource is different from the second time domain resource; and receiving or sending data on the second time domain resource.

In a possible design, an end symbol position of the first PDCCH overlaps the first time domain resource.

In a possible design, there is an offset between a start symbol position of the second time domain resource and the end symbol position of the first PDCCH.

In a possible design, a unit of a value of the offset is a symbol, and the value of the offset is an integer greater than zero.

In a possible design, an allocation length of the second time domain resource is less than or equal to an allocation length of the first time domain resource.

In a possible design, the communication method provided in this embodiment of this application further includes: sending first indication information to the terminal device, where the first indication information is used to indicate to determine the second time domain resource based on the time domain position of the first PDCCH and the first time domain resource.

In a possible design, the communication method provided in this embodiment of this application further includes: sending first configuration information to the terminal device, where the first configuration information is used to configure a plurality of search spaces; and sending second indication information to the terminal device, where the second indication information indicates at least one search space in the plurality of search spaces; and the sending first DCI to a terminal device through a first PDCCH includes: sending the first DCI to the terminal device through the first PDCCH in the at least one search space.

In a possible design, the second indication information further indicates information about a serving cell and/or information about a bandwidth part BWP.

According to a fourth aspect, an embodiment of this application provides a communication method. The communication method may be performed by a network device, or may be performed by a component (for example, a processor, a chip, or a chip system) of the network device. The method includes: sending second downlink control information DCI to a terminal device through a second physical downlink control channel PDCCH, where the second DCI includes a second time domain resource assignment TDRA indicator field, a value indicated by the second TDRA indicator field corresponds to a plurality of third time domain resources, a time domain position of the second PDCCH is used to determine a fourth time domain resource, and the fourth time domain resource is one of the plurality of third time domain resources; and receiving or sending data on the fourth time domain resource.

In a possible design, the communication method provided in this embodiment of this application further includes: sending third indication information to the terminal device, where the third indication information is used to indicate to determine the fourth time domain resource based on the time domain position of the second PDCCH.

In a possible design, the communication method provided in this embodiment of this application further includes: sending second configuration information to the terminal device, where the second configuration information is used to configure a plurality of search spaces; and sending fourth indication information to the terminal device, where the fourth indication information indicates at least one search space in the plurality of search spaces; and the sending second DCI to a terminal device through a second PDCCH includes: sending the second DCI to the terminal device through the second PDCCH in the at least one search space.

In a possible design, the fourth indication information further indicates information about a serving cell and/or information about a bandwidth part BWP.

According to a fifth aspect, an embodiment of this application provides a communication apparatus. The communication apparatus may be a terminal device, or a component (for example, a chip, a chip system, or a processor) of the terminal device. The communication apparatus includes a processing module and a transceiver module. The transceiver module is configured to receive first downlink control information DCI from a network device through a first physical downlink control channel PDCCH, where the first DCI includes a first time domain resource assignment TDRA indicator field, and the first TDRA indicator field is used to indicate a first time domain resource. The processing module is configured to determine a second time domain resource based on a time domain position of the first PDCCH and the first time domain resource, where the first time domain resource is different from the second time domain resource. The transceiver module is further configured to receive or send data on the second time domain resource.

In a possible design, that the processing module is configured to determine a second time domain resource based on a time domain position of the first PDCCH and the first time domain resource includes: The processing module is configured to determine the second time domain resource based on an end symbol position of the first PDCCH when the end symbol position of the first PDCCH overlaps the first time domain resource.

In a possible design, there is an offset between a start symbol position of the second time domain resource and the end symbol position of the first PDCCH.

In a possible design, a unit of a value of the offset is a symbol, and the value of the offset is an integer greater than zero.

In a possible design, an allocation length of the second time domain resource is less than or equal to an allocation length of the first time domain resource.

In a possible design, the transceiver module is further configured to receive first indication information from the network device. That the processing module is configured to determine a second time domain resource based on a time domain position of the first PDCCH and the first time domain resource includes: The processing module is configured to determine the second time domain resource based on the first indication information, the time domain position of the first PDCCH, and the first time domain resource.

In a possible design, the transceiver module is further configured to receive first configuration information from the network device, where the first configuration information is used to configure a plurality of search spaces. The transceiver module is further configured to receive second indication information from the network device, where the second indication information indicates at least one search space in the plurality of search spaces. That the transceiver module is configured to receive first DCI from a network device through a first PDCCH includes: The transceiver module is configured to receive the first DCI from the network device through the first PDCCH in the at least one search space.

In a possible design, the second indication information further indicates information about a serving cell and/or information about a bandwidth part BWP.

According to a sixth aspect, an embodiment of this application provides a communication apparatus. The communication apparatus may be a terminal device, or a component (for example, a chip, a chip system, or a processor) of the terminal device. The communication apparatus includes a processing module and a transceiver module. The transceiver module is configured to receive second downlink control information DCI from a network device through a second physical downlink control channel PDCCH, where the second DCI includes a second time domain resource assignment TDRA indicator field, and a value indicated by the second TDRA indicator field corresponds to a plurality of third time domain resources. The processing module is configured to obtain a fourth time domain resource, where there is a correspondence between the fourth time domain resource and a time domain position of the second PDCCH, and the fourth time domain resource is one of the plurality of third time domain resources. The transceiver module is further configured to receive or send data on the fourth time domain resource.

In a possible design, the transceiver module is further configured to receive third indication information from the network device. That the processing module is configured to obtain a fourth time domain resource includes: The processing module is configured to obtain, based on the third indication information and the time domain position of the second PDCCH, the fourth time domain resource indicated by the second TDRA indicator field.

In a possible design, the transceiver module is further configured to receive second configuration information from the network device, where the second configuration information is used to configure a plurality of search spaces. The transceiver module is further configured to receive fourth indication information from the network device, where the fourth indication information indicates at least one search space in the plurality of search spaces. That the transceiver module is configured to receive second DCI from a network device through a second PDCCH includes: The transceiver module is configured to receive the second DCI from the network device through the second PDCCH in the at least one search space.

In a possible design, the fourth indication information further indicates information about a serving cell and/or information about a bandwidth part BWP.

According to a seventh aspect, an embodiment of this application provides a communication apparatus. The communication apparatus may be, for example, a network device (for example, a base station) or a component (for example, a chip, a chip system, or a processor) of the network device. The communication apparatus includes a transceiver module. The transceiver module is configured to send first downlink control information DCI to a terminal device through a first physical downlink control channel PDCCH, where the first DCI includes a first time domain resource assignment TDRA indicator field, the first TDRA indicator field is used to indicate a first time domain resource, a time domain position of the first PDCCH and the first time domain resource are used to determine a second time domain resource, and the first time domain resource is different from the second time domain resource. The transceiver module is further configured to send data on the second time domain resource; or the transceiver module is configured to receive data on the second time domain resource.

In a possible design, an end symbol position of the first PDCCH overlaps the first time domain resource.

In a possible design, there is an offset between a start symbol position of the second time domain resource and the end symbol position of the first PDCCH.

In a possible design, a unit of a value of the offset is a symbol, and the value of the offset is an integer greater than zero.

In a possible design, an allocation length of the second time domain resource is less than or equal to an allocation length of the first time domain resource.

In a possible design, the transceiver module is further configured to send first indication information to the terminal device, where the first indication information is used to indicate to determine the second time domain resource based on the time domain position of the first PDCCH and the first time domain resource.

In a possible design, the transceiver module is further configured to send first configuration information to the terminal device, where the first configuration information is used to configure a plurality of search spaces. The transceiver module is further configured to send second indication information to the terminal device, where the second indication information indicates at least one search space in the plurality of search spaces. That the transceiver module is configured to send first DCI to a terminal device through a first PDCCH includes: The transceiver module is configured to send the first DCI to the terminal device through the first PDCCH in the at least one search space.

In a possible design, the second indication information further indicates information about a serving cell and/or information about a bandwidth part BWP.

According to an eighth aspect, an embodiment of this application provides a communication apparatus. The communication apparatus may be, for example, a network device (for example, a base station) or a component (for example, a chip, a chip system, or a processor) of the network device. The communication apparatus includes a transceiver module. The transceiver module is configured to send second downlink control information DCI to a terminal device through a second physical downlink control channel PDCCH, where the second DCI includes a second time domain resource assignment TDRA indicator field, a value indicated by the second TDRA indicator field corresponds to a plurality of third time domain resources, a time domain position of the second PDCCH is used to determine a fourth time domain resource, and the fourth time domain resource is one of the plurality of third time domain resources. The transceiver module is further configured to send data on the fourth time domain resource; or the transceiver module is configured to receive data on the fourth time domain resource.

In a possible design, the transceiver module is further configured to send third indication information to the terminal device, where the third indication information is used to indicate to determine the fourth time domain resource based on the time domain position of the second PDCCH.

In a possible design, the transceiver module is further configured to send second configuration information to the terminal device, where the second configuration information is used to configure a plurality of search spaces. The transceiver module is further configured to send fourth indication information to the terminal device, where the fourth indication information indicates at least one search space in the plurality of search spaces. That the transceiver module is configured to send second DCI to a terminal device through a second PDCCH includes: The transceiver module is configured to send the second DCI to the terminal device through the second PDCCH in the at least one search space.

In a possible design, the fourth indication information further indicates information about a serving cell and/or information about a bandwidth part BWP.

According to a ninth aspect, this application provides a communication apparatus, configured to implement the method according to any one of the first aspect or the possible designs of the first aspect, configured to implement the method according to any one of the second aspect or the possible designs of the second aspect, configured to implement the method according to any one of the third aspect or the possible designs of the third aspect, or configured to implement the method according to any one of the fourth aspect or the possible designs of the fourth aspect.

According to a tenth aspect, an embodiment of this application provides a communication apparatus, including a processor and an interface circuit. The processor is configured to communicate with another apparatus by using the interface circuit, and is configured to implement the method according to any one of the first aspect or the possible designs of the first aspect, configured to implement the method according to any one of the second aspect or the possible designs of the second aspect, configured to implement the method according to any one of the third aspect or the possible designs of the third aspect, or configured to implement the method according to any one of the fourth aspect or the possible designs of the fourth aspect. There are one or more processors.

According to an eleventh aspect, an embodiment of this application provides a communication apparatus, including a processor. The processor is coupled to a memory, is configured to execute a program or instructions stored in the memory, and is configured to implement the method according to any one of the first aspect or the possible designs of the first aspect, configured to implement the method according to any one of the second aspect or the possible designs of the second aspect, configured to implement the method according to any one of the third aspect or the possible designs of the third aspect, or configured to implement the method according to any one of the fourth aspect or the possible designs of the fourth aspect. The memory may be located inside the communication apparatus, or may be located outside the communication apparatus. There are one or more processors.

According to a twelfth aspect, an embodiment of this application provides a computer-readable medium. The computer-readable medium stores instructions or a program. When the instructions or the program is run on a computer, the computer is enabled to implement the method according to any one of the first aspect or the possible designs of the first aspect, implement the method according to any one of the second aspect or the possible designs of the second aspect, implement the method according to any one of the third aspect or the possible designs of the third aspect, or implement the method according to any one of the fourth aspect or the possible designs of the fourth aspect.

According to a thirteenth aspect, an embodiment of this application provides a computer program product, including computer program code. When the computer program code is run on a computer, the computer is enabled to implement the method according to any one of the first aspect or the possible designs of the first aspect, implement the method according to any one of the second aspect or the possible designs of the second aspect, implement the method according to any one of the third aspect or the possible designs of the third aspect, or implement the method according to any one of the fourth aspect or the possible designs of the fourth aspect.

According to a fourteenth aspect, an embodiment of this application provides a chip. The chip includes a processor. The processor is coupled to a memory. The memory stores a program or instructions. When the program or the instructions stored in the memory is executed by the processor, the method according to any one of the first aspect or the possible designs of the first aspect is implemented, the method according to any one of the second aspect or the possible designs of the second aspect is implemented, the method according to any one of the third aspect or the possible designs of the third aspect is implemented, or the method according to any one of the fourth aspect or the possible designs of the fourth aspect is implemented.

According to a fifteenth aspect, an embodiment of this application provides a communication system. The communication system includes the communication apparatus according to any one of the fifth aspect or the possible designs of the fifth aspect and the communication apparatus according to any one of the seventh aspect or the possible designs of the seventh aspect, or the communication system includes the communication apparatus according to any one of the sixth aspect or the possible designs of the sixth aspect and the communication apparatus according to any one of the eighth aspect or the possible designs of the eighth aspect.

For technical effects brought by any design manner of the second aspect to the fifteenth aspect, refer to technical effects brought by different design manners of the first aspect. Details are not described herein again.

DETAILED DESCRIPTION OF ILLUSTRATIVE EMBODIMENTS

Figure 1:
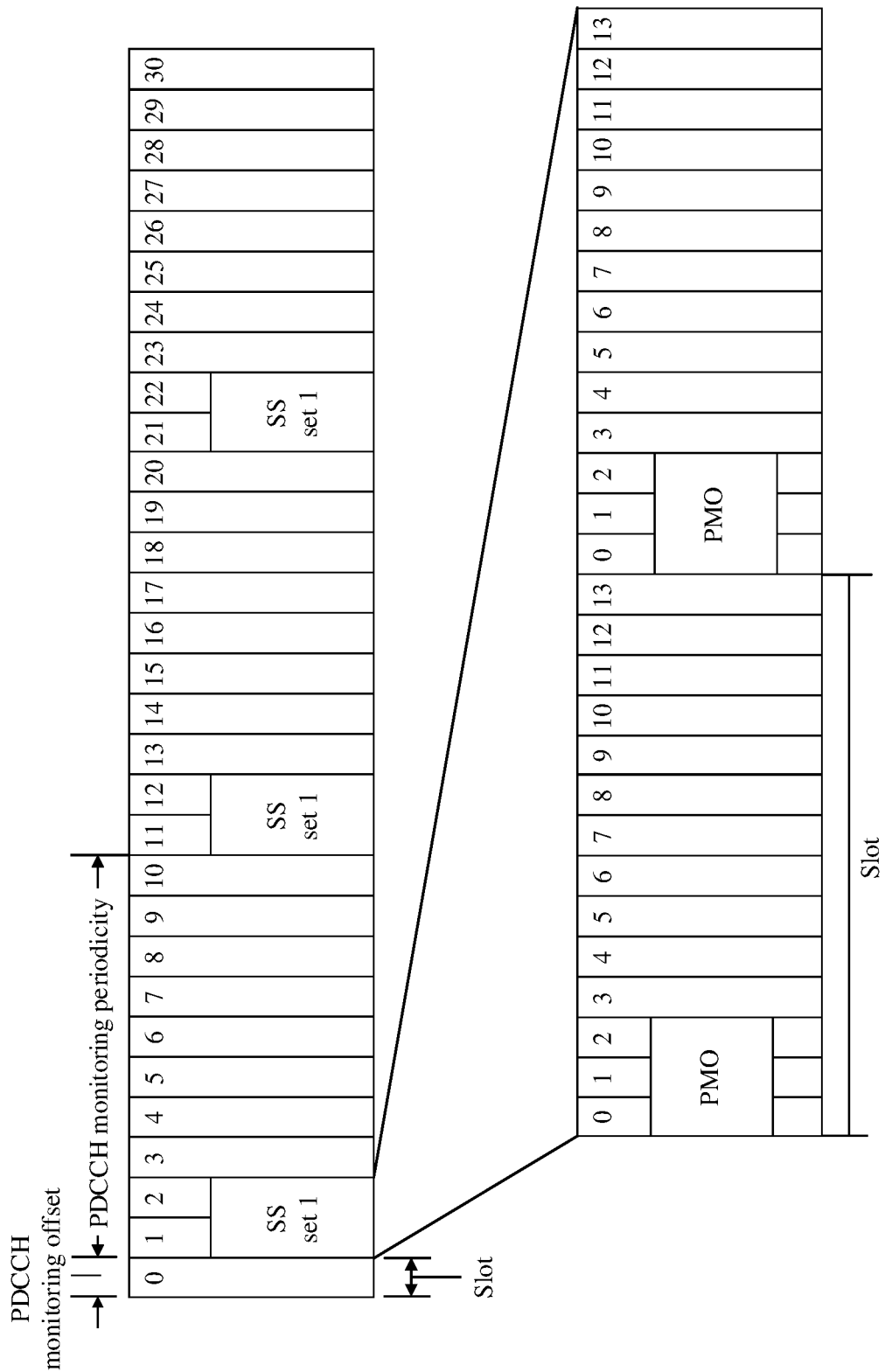
FIG. 1 is a schematic diagram of a control channel monitoring configuration according to an embodiment of this application.

In the specification and accompanying drawings of this application, the terms "first", "second", and the like are intended to distinguish between different objects or to distinguish between different processing for a same object, but do not indicate a particular order of objects. In addition, the terms "include", "have", and any variant thereof mentioned in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. It should be noted that, in embodiments of this application, the word "exemplary", "for example", or the like is used to represent giving an example, an illustration, or a description. Any embodiment or design scheme described as "exemplary" or "for example" in embodiments of this application should not be explained as being more preferred or having more advantages than another embodiment or design scheme. Exactly, use of the word "exemplary", "for example", or the like is intended to present a related concept in a specific manner.

To make embodiments of this application clearer, some terms and processing procedures in embodiments of this application are first briefly described.

1. Physical Downlink Control Channel (PDCCH)

The PDCCH is used for downlink control information (DCI) transmission. There are a plurality of formats of DCI, and DCI with different functions has different formats. For example, formats of DCI for uplink data scheduling are format 0_0 and format 0_1, and formats of DCI for downlink data scheduling are format 1_0 and format 1_1.

2. Control Resource Set (CORESET)

The control resource set is a time-frequency resource that can be used to carry the PDCCH. The control resource set includes one or more resource blocks in frequency domain, includes one or more time domain symbols in time domain, and may be located at any position in a slot. One control resource set may be configured for one or more terminal devices, and one or more control resource sets may be configured for one terminal device.

3. Search Space (SS)

The search space may also be described as a search space set (search space sets, SS sets). One search space corresponds to one control resource set. In other words, the search space is associated with the control resource set.

Search spaces are classified into a common search space (CSS) and a UE-specific search space (USS). The CSS is for transmission of control information related to paging, a random access response, a broadcast control channel (BCCH), or the like. Control information transmitted by a network device to a terminal device using the CSS is common control information. The USS is for transmission of terminal device-specific control information related to a downlink shared channel (DL-SCH), an uplink shared channel (UL-SCH), or the like.

In a cell, the network device may configure one or more control resource sets and/or one or more search spaces for the terminal device. The control resource set and the search space are configured based on a bandwidth part (BWP). For example, a maximum of three control resource sets are configured in one BWP, a maximum of 10 search spaces are configured in one BWP, one search space corresponds to one control resource set, and a plurality of search spaces may correspond to a same control resource set. The terminal device monitors the PDCCH based on a configuration of the search space in one or more control resource sets configured in an active BWP.

4. PDCCH Monitoring Occasion (PMO)

The PMO represents an occasion for monitoring a PDCCH. The terminal device determines the monitoring occasion of the PDCCH based on a configuration of the search space and a configuration of the CORESET. The configuration of the search space includes a PDCCH monitoring periodicity, PDCCH monitoring offset information, monitoring symbol information in a PDCCH slot, duration information, and the like. The monitoring symbol information in the PDCCH slot indicates a start symbol position at which the PDCCH is monitored in a slot. A quantity of symbols for monitoring the PDCCH is determined based on a quantity of consecutive symbols in the configuration of the CORESET. Duration refers to a quantity of slots in which the search space continuously exists, namely, a quantity of consecutive slots in which the terminal device monitors the PDCCH.

For example, FIG. 1 is a schematic diagram of a PDCCH monitoring configuration. In the configuration shown in FIG. 1, an identifier "SS set 1" indicates a search space set 1, an identifier "PMO" indicates the PDCCH monitoring occasion, the PDCCH monitoring periodicity is 10 slots, a PDCCH monitoring offset is one slot, and the start symbol position at which the PDCCH is monitored in the slot is a position of a symbol 0. The quantity of symbols for monitoring the PDCCH is 3. The quantity of consecutive slots in which the terminal device monitors the PDCCH is 2.

5. Channel Bandwidth and Transmission Bandwidth

The channel bandwidth may alternatively be understood as a carrier bandwidth of a cell. The channel bandwidth includes a guard bandwidth and a transmission bandwidth.

The transmission bandwidth is a bandwidth for transmitting a signal on a channel.

Figure 2:
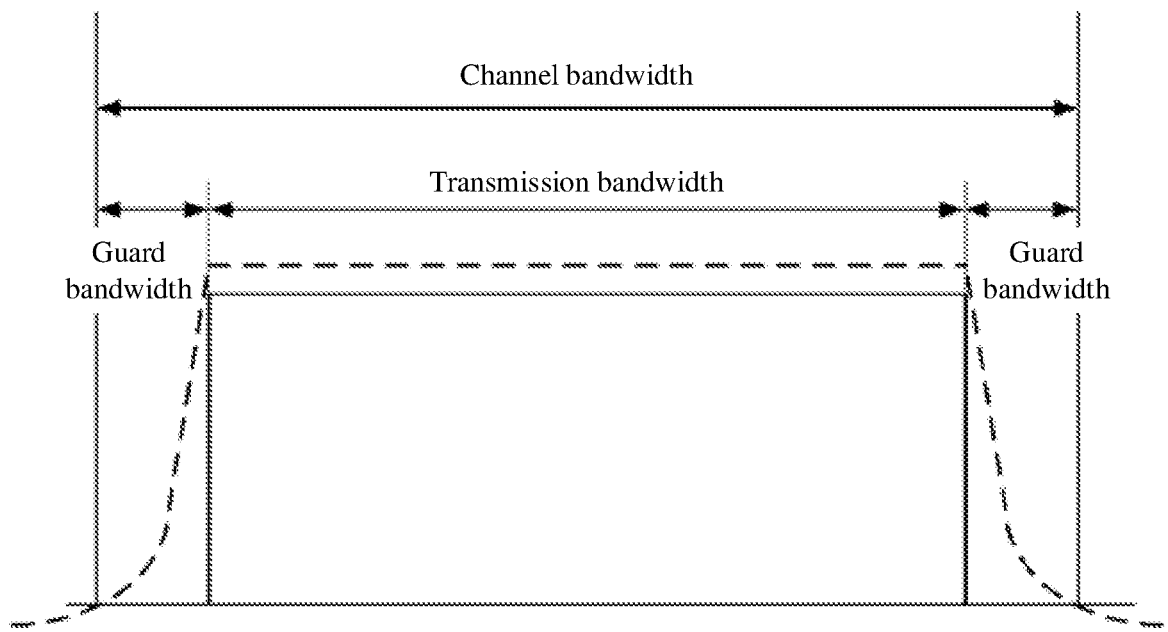
FIG. 2 is a schematic diagram of a channel bandwidth and a transmission bandwidth according to an embodiment of this application.

For example, FIG. 2 is a schematic diagram of a channel bandwidth, a transmission bandwidth, and guard bandwidths.

It should be noted that "the carrier bandwidth" or "a cell bandwidth" in embodiments of this application is the channel bandwidth.

6. Numerology

The numerology includes one or more of parameters such as a subcarrier spacing (SCS), a symbol length, a slot length, and a cyclic prefix (CP) length. For example, the numerology is defined by using the SCS and a cyclic prefix. In new radio (NR), a plurality of numerologies are supported, for example, as shown in Table 1.

TABLE 1

| μ | Δf = $2^\mu \cdot 15$ [kHz] | Cyclic prefix |
|---|---|---|
| 0 | 15 | Normal cyclic prefix |
| 1 | 30 | Normal cyclic prefix |
| 2 | 60 | Normal cyclic prefix and extended cyclic prefix |
| 3 | 120 | Normal cyclic prefix |
| 4 | 240 | Normal cyclic prefix |

μ represents an identifier of the subcarrier spacing, and Δf represents a value of the subcarrier spacing.

For a time-frequency resource, a time unit may be defined in time domain. A type of the time unit may be, for example, but is not limited to, a frame, a subframe, a slot, or a symbol. For example, one frame includes one or more subframes, one subframe includes one or more slots, and one slot includes one or more symbols. A frame length is, for example, 10 ms, and a subframe length is, for example, 1 ms. The slot length is represented as a quantity of symbols included in the slot. The slot length and the symbol length are related to the numerology. For example, when the cyclic prefix is the normal cyclic prefix, parameter values are shown in Table 2. For another example, when the cyclic prefix is the extended cyclic prefix, parameter values are shown in Table 3.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

In Table 2 and Table 3, μ represents the identifier of the subcarrier spacing, $N_{symb}^{slot}$ represents a quantity of symbols included in one slot, $N_{slot}^{frame,\mu}$ represents a quantity of slots included in one frame, and $N_{slot}^{subframe,\mu}$ represents a quantity of slots included in one subframe.

Figure 3:
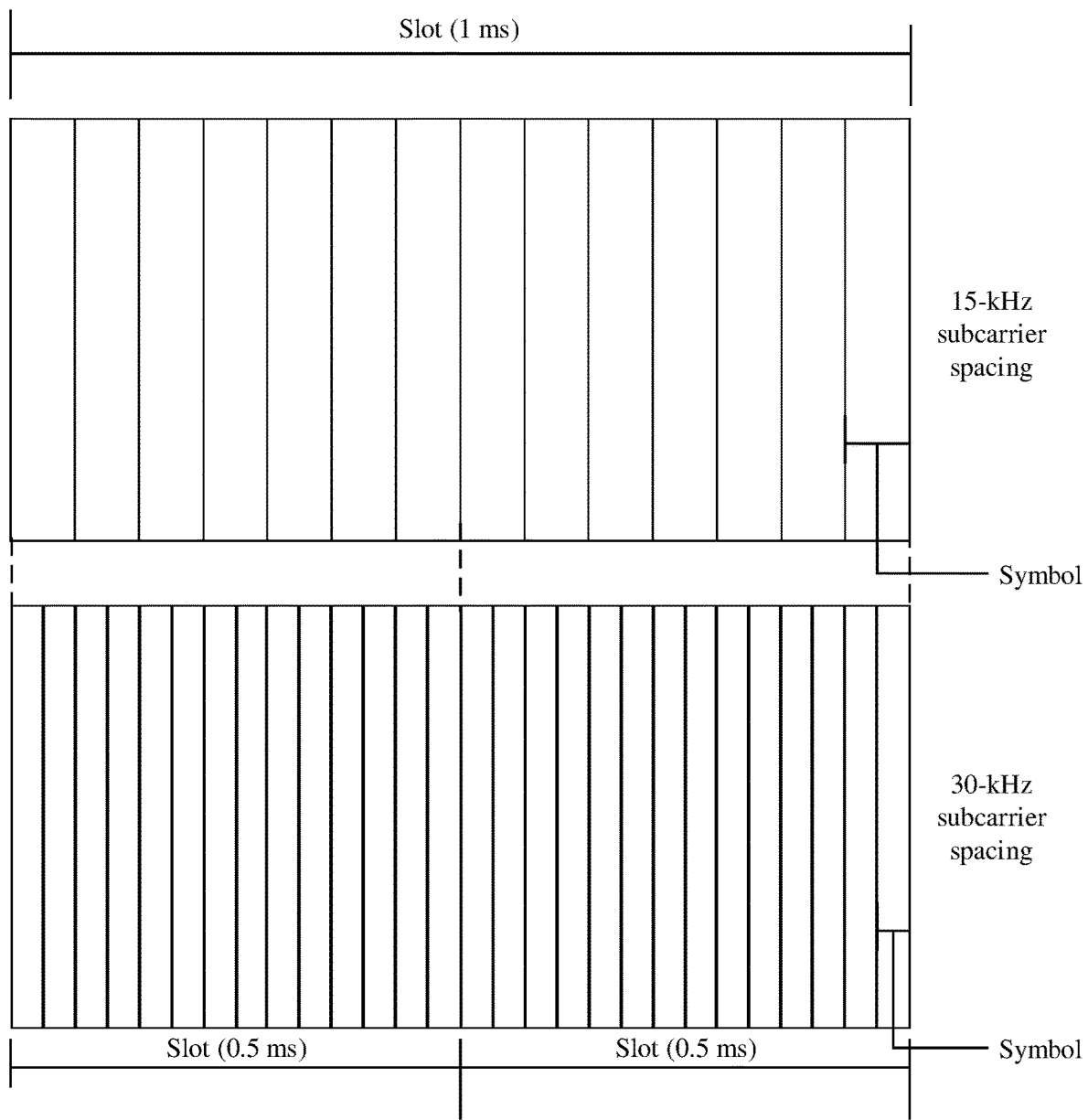
FIG. 3 is a schematic diagram of a length of a time unit according to an embodiment of this application.

If a subcarrier spacing $\Delta f_1$ is k times another subcarrier spacing $\Delta f_2$, that is, $\Delta f_1 = k \times \Delta f_2$, a sum of lengths of time units corresponding to k subcarrier spacings $\Delta f_1$ is equal to a length of a time unit corresponding to one subcarrier spacing $\Delta f_2$. For example, FIG. 3 shows a relationship between lengths of time units corresponding to two subcarrier spacings. A sum of two symbol lengths with "a subcarrier spacing of 30 kHz" is equal to one symbol length with "a subcarrier spacing of 15 kHz", and a sum of two slot lengths with "the subcarrier spacing of 30 kHz" is equal to one slot length with "the subcarrier spacing of 15 kHz".

In NR, a resource granularity of data transmission in frequency domain is a resource block (RB), and a minimum granularity in time domain is a symbol. One RB includes 12 subcarriers. Because subcarrier spacings of different numerologies are different, bandwidths of the RB and duration of one symbol are accordingly different in different numerologies.

7. Bandwidth Part (BWP)

The BWP is a plurality of consecutive resource blocks on a carrier. A bandwidth occupied by the BWP is less than or equal to the carrier bandwidth of the cell. One or more uplink BWPs may be configured for one terminal device in one cell. For example, a maximum of four uplink BWPs are configured. In the one or more configured uplink BWPs, at least one uplink BWP is activated. For example, at least one of the four configured uplink BWPs is activated. The terminal device sends data in the active uplink BWP. One or more downlink BWPs may be configured for the terminal device in the cell. For example, a maximum of four downlink BWPs are configured. In the one or more configured downlink BWPs, at least one downlink BWP is activated. For example, at least one of the four configured downlink BWPs is activated. The terminal device receives data in the active downlink BWP.

8. Carrier Aggregation (CA)

The CA is to aggregate two or more component carriers (CC) together to support a higher transmission bandwidth.

One downlink component carrier corresponds to one cell. In other words, the cell includes the downlink component carrier, and the downlink carrier unit is usually understood as the cell. In embodiments of this application, the component carrier and the cell are interchanged.

To efficiently utilize fragmented spectrums, the carrier aggregation supports aggregation of different types of component carriers. The different types of component carriers may specifically include component carriers with a same bandwidth or different bandwidths, adjacent or non-adjacent component carriers in a same frequency band, and component carriers in different frequency bands.

9. Time Domain Resource Assignment for Data Scheduling

The network device indicates a time domain resource position for dynamic data scheduling to the terminal device using downlink control information (DCI) and radio resource control (RRC) signaling.

The DCI includes a time domain resource assignment (TDRA) indicator field, and a value indicated by the TDRA indicator field corresponds to a row index in a time domain resource assignment information set (or described as a time domain resource assignment table).

For example, the TDRA indicator field includes four bits, and can indicate one of a maximum of 16 groups of time domain resource assignment information. When the value indicated by the TDRA indicator field is m, the corresponding row index of time domain resource assignment information is m+1. For example, when the bits included in the TDRA indicator field are "0001", and the indicated value m is 1, the corresponding row index is 2. That is, time domain resource assignment information indicated by the TDRA indicator field is time domain resource assignment information corresponding to the row index 2 in the time domain resource assignment information set.

The RRC signaling is used to configure the time domain resource assignment information set for the terminal device. The time domain resource assignment information set includes a time domain resource assignment information set used for uplink data scheduling or a time domain resource assignment information set used for downlink data scheduling. The time domain resource assignment information set is configured based on the BWP. That is, one time domain resource assignment information set may be correspondingly configured in one BWP. The time domain resource assignment information set includes one or more groups of time domain resource assignment information. One group of time domain resource assignment information corresponds to one row index (row index). The group of time domain resource assignment information indicates one or more of the following content: a mapping type (mapping type) of data; a quantity of offset slots between control information and scheduled data; and a start symbol position (denoted as S) and an allocation length (denoted as L) that are of the scheduled data in a slot, where the allocation length is a quantity of consecutive symbols occupied by the scheduled data in the slot.

The quantity of offset slots between the control information and the scheduled data may alternatively be described as "a slot offset between the control information and the data scheduled using the control information". If the time domain resource assignment information does not include the parameter "the quantity of offset slots between the control information and the scheduled data", a value of the parameter is zero by default. A quantity of offset slots between a time domain position of a PDCCH for transmitting the control information and a time domain position of a physical downlink shared channel (PDSCH) scheduled by the PDCCH is denoted as $K_0$. A quantity of offset slots between the time domain position of the PDCCH for transmitting the control information and a time domain position of a physical uplink shared channel (PUSCH) scheduled by the PDCCH is denoted as $K_2$. The start symbol position and the allocation length that are of the scheduled data in the slot may be alternatively indicated by using a parameter "a start and length indicator" ("SLIV"). For example, the network device obtains the SLIV based on S and L, and then sends the SLIV to the terminal device via the downlink control information (DCI). After receiving the configuration information, the terminal device obtains S and L based on the SLIV. Alternatively, the network device independently indicates S and L to the terminal device, that is, indicates S and L to the terminal device using the time domain resource assignment information.

For example, the SLIV, S, and L satisfy the following relationship:

$$\begin{cases} SLIV = 14 \times (L-1) + S, \text{ where } (L-1) \leq 7 \\ SLIV = 14 \times (14 - L + 1) + (14 - 1 - S), \text{ where } (L-1) > 7 \\ \quad 0 < L \leq 14 - S \end{cases} \quad (1)$$

Specifically, "a mapping type of data" is described as follows. Downlink data scheduling is used as an example. Based on requirements for allocating a time domain resource of a physical downlink shared channel (PDSCH) in a slot, there are two mapping types of data: a type A and a type B. The two mapping types can satisfy different time domain resource assignment requirements. The requirements for allocating a time domain resource of a PDSCH include a start symbol position requirement and an allocation length requirement that are of the PDSCH. One slot includes a specific quantity of symbols, and one symbol includes a cyclic prefix (CP). There is a normal cyclic prefix and an extended cyclic prefix. For example, refer to Table 4. When the cyclic prefix is the normal cyclic prefix, a start symbol position (namely, S) supported by the type A is any one of a symbol 0 to a symbol 3, and a range of an allocation length (namely, L) supported by the type A is 3 symbols to 14 symbols. A start symbol position supported by the type B is any one of the symbol 0 to a symbol 12, and an allocation length supported by the type B is two symbols, four symbols, or seven symbols. When the cyclic prefix is the extended cyclic prefix, a start symbol position (namely, S) supported by the type A is any one of a symbol 0 to a symbol 3, and a range of an allocation length (namely, L) supported by the type A is 3 symbols to 12 symbols. A start symbol position supported by the type B is any one of the symbol 0 to a symbol 10, and an allocation length supported by the type B is two symbols, four symbols, or six symbols. (S+L) in Table 4 is used to indicate a candidate index of the first symbol located after an end symbol of the PDSCH.

TABLE 4

| Mapping type of data | Normal cyclic prefix | | | Extended cyclic prefix | | |
| --- | --- | --- | --- | --- | --- | --- |
| | S | L | S + L | S | L | S + L |
| Type A | {0, 1, 2, 3} | {3, . . . , 14} | {3, . . . , 14} | {0, 1, 2, 3} | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

Figure 4:
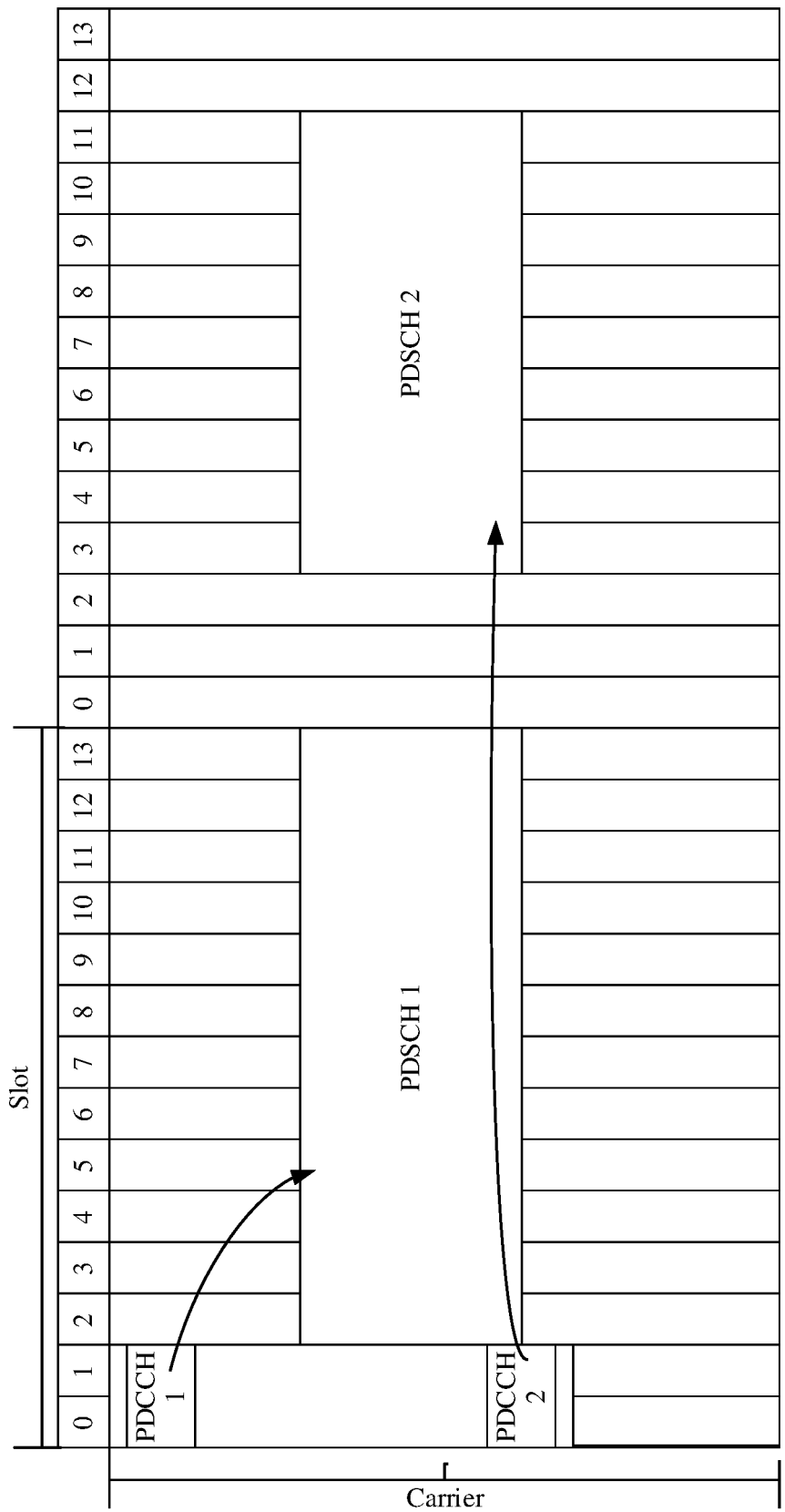
FIG. 4 is a schematic diagram of resource positions of physical downlink control channels and physical downlink shared channels according to an embodiment of this application.

Specifically, "an offset slot between the control information and the data scheduled using the control information" is described as follows: The downlink data scheduling is still used as an example. FIG. 4 shows two time domain resource assignment statuses. In FIG. 4, a quantity of offset slots between control information in the first slot and data in the first slot is 0. That is, a PDCCH 1 and a PDSCH 1 are in a same slot. A start symbol position of the PDSCH 1 is a symbol position whose symbol index is 2, and an allocation length of the PDSCH 1 is 12 symbols, that is, from a symbol 2 to a symbol 13. The quantity of offset slots between the control information and the data in the second slot is 1. That is, a slot offset between a PDCCH 2 and a PDSCH 2 is one slot. A start symbol position of the PDSCH 2 is a symbol position whose symbol index is 3, and an allocation length of the PDSCH 2 is nine symbols, that is, from a symbol 3 to a symbol 11.

The start symbol position of the PDSCH is further related to a symbol position of the PDCCH. The terminal device does not need to receive scheduled data that does not satisfy a position requirement. If the PDCCH and the PDSCH scheduled by the PDCCH are transmitted in a same slot, and the PDCCH is not in the first three symbols in the slot, the terminal device does not need to receive a PDSCH of the mapping type A in the slot. If the first symbol of the PDCCH for scheduling the PDSCH is later than the first symbol of a PDSCH indicated in the time domain resource assignment information, the terminal device does not need to receive a PDSCH of the mapping type B in the slot. A resource of the PDCCH and a resource of the PDSCH are independent of each other, and do not overlap.

Figure 5:
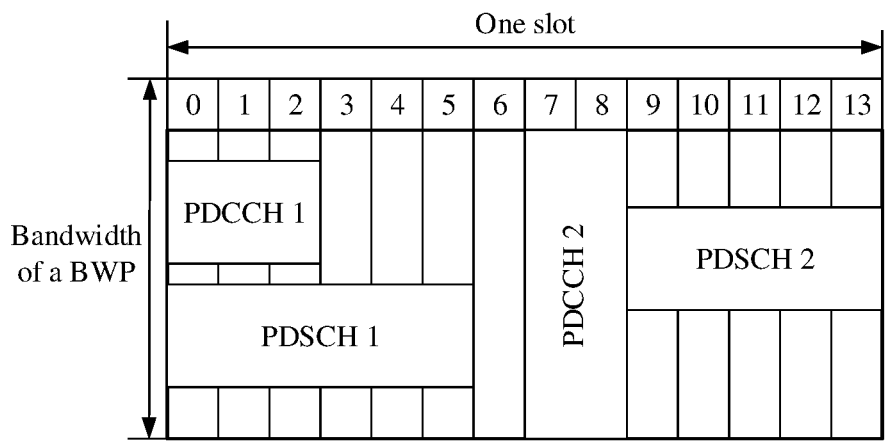
FIG. 5 is another schematic diagram of resource positions of physical downlink control channels and physical downlink shared channels according to an embodiment of this application.

For example, FIG. 5 shows two position relationships between a start symbol position of a PDSCH and a symbol position of a PDCCH. A time-frequency resource in FIG. 5 shows a bandwidth of a BWP in frequency domain and a slot in time domain. Numbers (for example, 0 to 13) indicate symbol indexes. When the PDCCH and the PDSCH are on different frequency resources, the start symbol position of the PDSCH is related to the start symbol position of the PDCCH. As shown in FIG. 5, a PDCCH 1 is located in the first three symbols in the slot, and therefore may schedule type-A data of a PDSCH 1. When the PDCCH, for example, a PDCCH 2 in FIG. 5, occupies a bandwidth of an entire BWP, a PDSCH 2 scheduled by the PDCCH 2 is located on a time domain resource after an end symbol of the PDCCH 2 in time domain.

Figure 6:
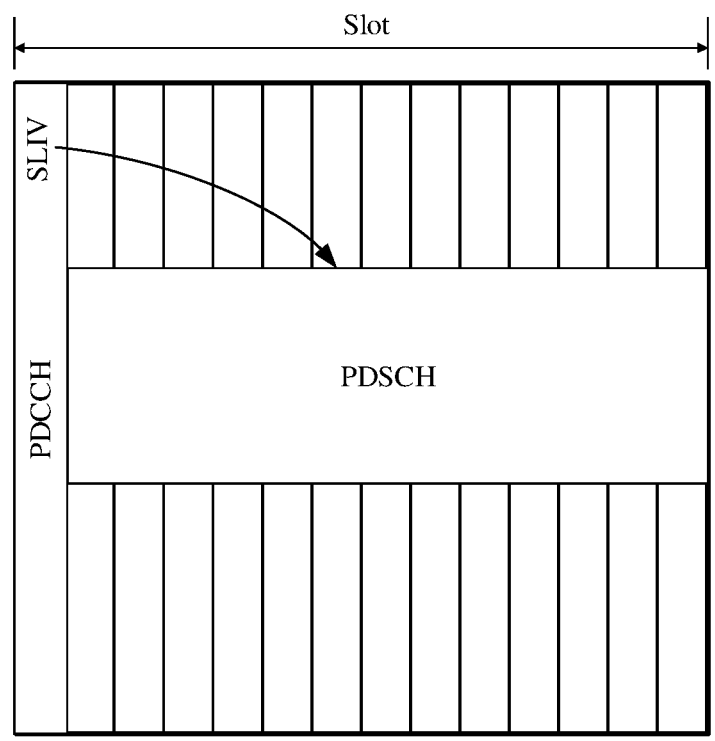
FIG. 6 is still another schematic diagram of resource positions of a physical downlink control channel and a physical downlink shared channel according to an embodiment of this application.

In a communication protocol, the time domain resource assignment information set (for example, the time domain resource assignment table) supports a maximum of 16 groups of time domain resource assignment information. For a cell with a small carrier bandwidth (for example, 20 MHz), a frequency domain width of a control resource set to which a PDCCH time-frequency resource belongs is usually a bandwidth of a BWP, and the bandwidth of the BWP is less than or equal to the carrier bandwidth of the cell. In addition, the start symbol position and the allocation length that are of the scheduled data in the slot may alternatively be represented by using the parameter "the start and length indicator" ("SLIV"). As shown in FIG. 6, for example, a frequency domain width of a PDCCH is the bandwidth of the BWP, and one symbol (where the symbol is a symbol 0) is occupied in time domain.

Considering requirements of different start symbol positions and allocation lengths that are of the scheduled data and different slot offsets, the network device supports 16 groups of time domain resource assignment information, for example, as shown in Table 5. Table 5 is a time domain resource assignment table of a PDSCH. In a time domain resource assignment table, a row index corresponding to the first group of time domain resource assignment information is 1, a row index corresponding to the second group of time domain resource assignment information is 2, and so on. The 16 groups of time domain resource assignment information are specifically as follows: six groups of PDSCH time domain resources that use a symbol 1 as a start symbol position and that have different allocation lengths, for example, time domain resource assignment information shown by the row index 1 to a row index 6; four groups of PDSCH time domain resources that use a symbol 2 as a start symbol position and that have different lengths, for example, time domain resource assignment information shown by a row index 7 to a row index 10; four groups of PDSCH time domain resources that use different symbols as start symbol positions and that have different lengths, for example, time domain resource assignment information shown by a row index 11 to a row index 14; and two groups of PDSCH time domain resources whose $K_0$ is not equal to 0, for example, time domain resource assignment information shown by a row index 15 and a row index 16. A group of time domain resource assignment information whose row index is 2 is used as an example. In the group of time domain resource assignment information, the mapping type of the data is the type A, the quantity (namely, $K_0$) of offset slots between the control information and the scheduled data is 0, the start symbol position (namely, S) of the scheduled data in the slot is a symbol position whose symbol index is 1, and the allocation length (namely, L) of the scheduled data in the slot is 12 symbols. In other words, symbols occupied by the scheduled data in the slot are a symbol 1 to a symbol 12.

TABLE 5

| Row index | Mapping type of data | $K_o$ | S | L |
|---|---|---|---|---|
| 1 | Type A | 0 | 1 | 13 |
| 2 | Type A | 0 | 1 | 12 |
| 3 | Type A | 0 | 1 | 11 |

TABLE 5-continued

| Row index | Mapping type of data | $K_o$ | S | L |
|---|---|---|---|---|
| 4 | Type A | 0 | 1 | 10 |
| 5 | Type A | 0 | 1 | 9 |
| 6 | Type A | 0 | 1 | 8 |
| 7 | Type A | 0 | 2 | 7 |
| 8 | Type A | 0 | 2 | 6 |
| 9 | Type A | 0 | 2 | 5 |
| 10 | Type A | 0 | 2 | 4 |
| 11 | Type B | 0 | 4 | 7 |
| 12 | Type B | 0 | 8 | 4 |
| 13 | Type B | 0 | 11 | 2 |
| 14 | Type B | 0 | 6 | 7 |
| 15 | Type A | 2 | 1 | 13 |
| 16 | Type A | 2 | 1 | 12 |

Because a quantity of groups of time domain resource assignment information configured in the foregoing example is limited (for example, 16 groups in Table 5), flexibility of time domain resource assignment is insufficient, and flexibility of data scheduling in terms of time is also insufficient.

Figure 7:
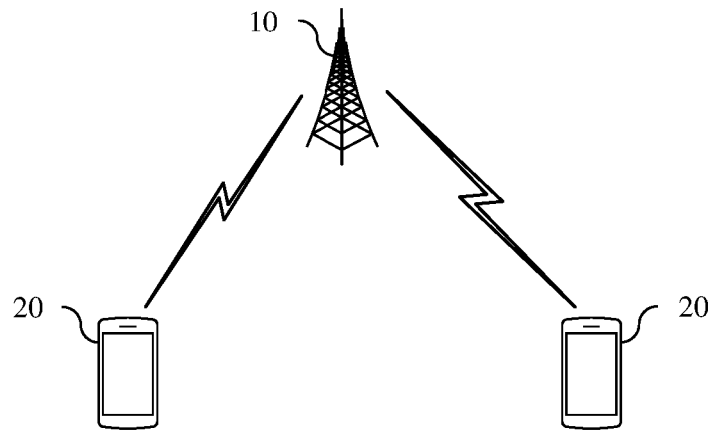
FIG. 7 is a schematic diagram of an architecture of a communication system according to an embodiment of this application.

In view of this, embodiments of this application provide a communication method. The communication method in embodiments of this application is applicable to various communication systems, for example, is applicable to a long term evolution (LTE) communication system, a 5th generation (5G) communication system, an NR communication system, another similar communication system, or a future evolved communication system. FIG. 7 is a schematic diagram of a communication system to which the communication method according to embodiments of this application is applicable. The communication system may include one network device 10 and one or more terminal devices 20 (where FIG. 7 shows only two terminal devices) wirelessly connected to the network device 10. FIG. 7 is merely a schematic diagram, and does not constitute a limitation on an application scenario of the communication method in embodiments of this application.

The network device 10 is a device in a wireless network, for example, a radio access network (RAN) node that connects the terminal device to the wireless network. The RAN node may be specifically: a gNodeB (gNB), a transmission reception point (TRP), an evolved NodeB (eNB), a radio network controller (RNC), a NodeB (NB), a base station controller (BSC), a base transceiver station (BTS), a home base station, a base band unit (BBU), a wireless fidelity (Wi-Fi) access point (AP), or the like. In a network structure, the network device may include a centralized unit (CU) node, a distributed unit (DU) node, or a RAN device including the CU node and the DU node.

The terminal device 20, also referred to as user equipment (UE), a mobile station (MS), a mobile terminal (MT), or the like, is a device that provides voice/data connectivity for a user, for example, a handheld device having a wireless connection function or a vehicle-mounted device. The terminal device may be specifically a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

The communication system and a service scenario that are described in embodiments of this application are intended to describe the technical solutions in embodiments of this application more clearly, and do not constitute a limitation on the technical solutions provided in embodiments of this application. A person of ordinary skill in the art may know that with evolution of a network architecture and emergence of a new service scenario, the technical solutions provided in embodiments of this application are also applicable to a similar technical problem.

The following describes in detail the communication method provided in embodiments of this application.

It should be noted that names of messages between network elements, names of parameters in the messages, or the like in the following embodiments of this application are merely examples, and there may be other names during specific implementation. This is uniformly described herein. Details are not described below again.

Figure 8:
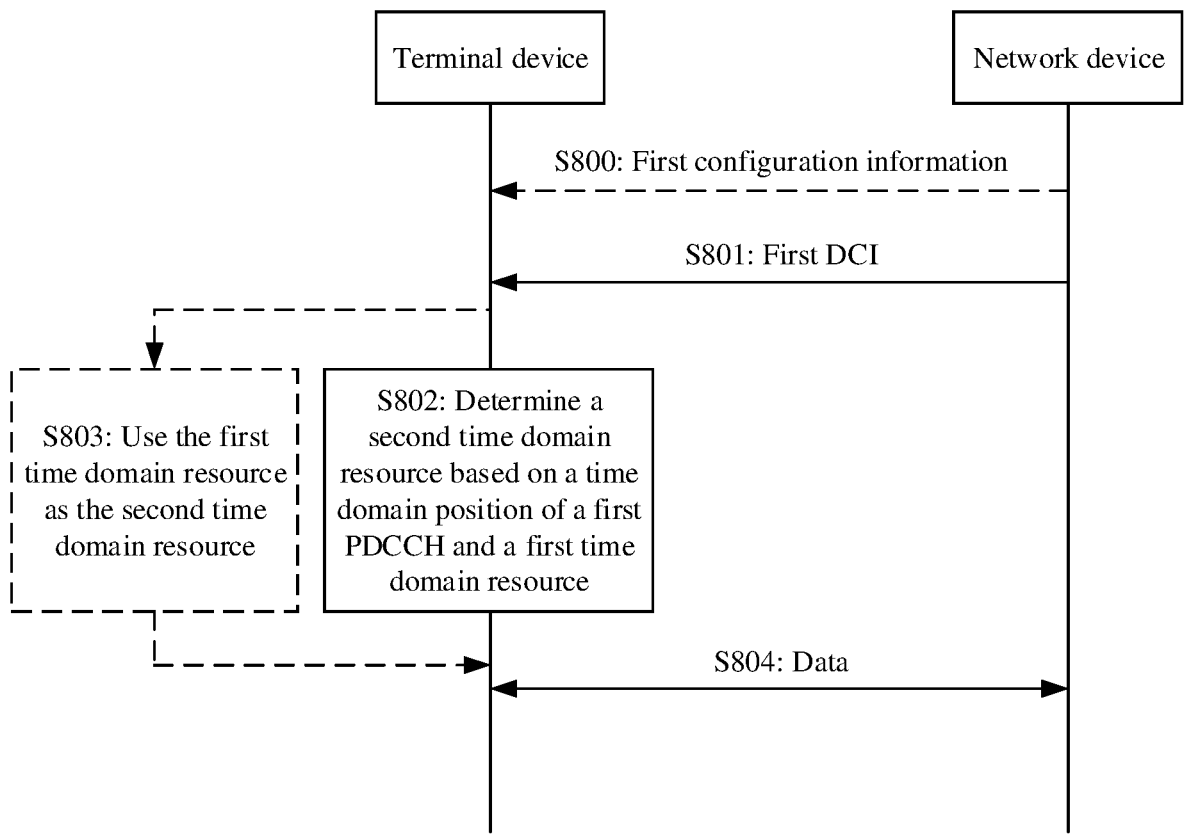
FIG. 8 is a schematic flowchart of a communication method according to an embodiment of this application.

An embodiment of this application provides a communication method. Refer to FIG. 8. The communication method includes the following steps.

Optionally, S800: A network device sends first configuration information to a terminal device. Accordingly, the terminal device receives the first configuration information from the network device.

The first configuration information includes information for configuring a time domain resource assignment information set in a BWP. The time domain resource assignment information set may be a time domain resource assignment table. Optionally, the time domain resource assignment information set is configured based on an initially configured symbol quantity and symbol position of a first PDCCH. For example, an initially configured symbol of the first PDCCH may be one symbol, namely, "a symbol 0". In this case, in the example of downlink data scheduling, the time domain resource assignment information set may be the time domain resource assignment table shown in Table 5. For related descriptions of "the time domain resource assignment information set", refer to the foregoing related descriptions of the "time domain resource assignment for data scheduling". Details are not described herein again.

The first configuration information may further include information for configuring a search space. For example, the network device configures at least two SSs for the terminal device in one BWP. The terminal device may obtain, based on the foregoing configuration of the SS, a symbol position occupied by a PMO in time domain. The plurality of SSs may be associated with a same control resource set or different control resource sets. For related descriptions of the PMO, refer to the foregoing related descriptions of the "PDCCH monitoring occasion". Details are not described herein again.

Figure 9:
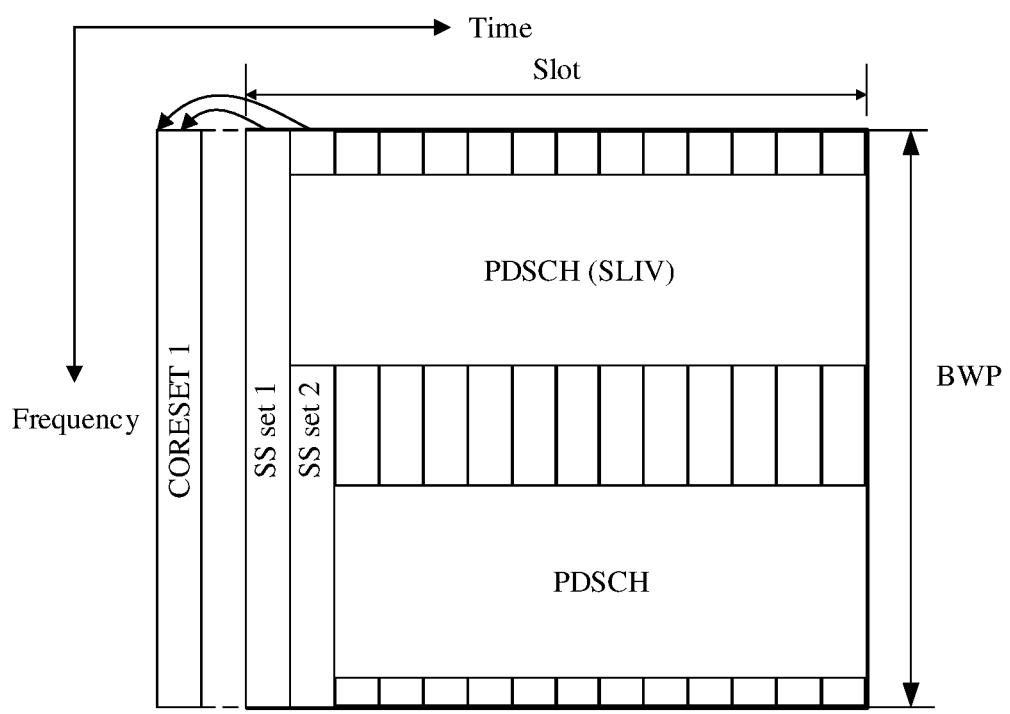
FIG. 9 is a schematic diagram of resource positions of control information and search spaces according to an embodiment of this application.

For example, refer to FIG. 9. The first configuration information is used to configure two search space sets for the terminal device, which are denoted as a search space set 1 (SS set 1) and a search space set 2 (SS set 2). Both the SS set 1 and the SS set 2 are associated with a control resource set 1 (CORESET 1). Details are shown by curves with arrows in FIG. 9. A frequency domain width of the control resource set 1 is a bandwidth of an entire BWP, and the control resource set 1 occupies one symbol in time domain. The terminal device monitors the first PDCCH on a symbol 0 in a slot in which the SS set 1 is located, and the terminal device monitors the first PDCCH on a symbol 1 in a slot in which the SS set 2 is located.

It should be noted that the first configuration information is carried in RRC signaling. The information used to "configure a time domain resource assignment information set" and the information used to "configure a search space" may be carried in same RRC signaling, or may be carried in different RRC signaling.

S801: The network device sends first DCI to the terminal device through the first PDCCH. Accordingly, the terminal device receives the first DCI from the network device through the first PDCCH.

The first DCI includes a first TDRA indicator field, and the first TDRA indicator field is used to indicate a first time domain resource. The PDSCH time domain resource assignment information shown in Table 5 is still used as an example. When a value of four bits of the first TDRA indicator field is "0001", the first time domain resource is a time domain resource indicated by the time domain resource assignment information whose row index is 2 in Table 5. That is, a quantity of offset slots between the first PDCCH and a PDSCH scheduled by the first PDCCH is 0. A start symbol position of the PDSCH in a slot is a symbol position whose symbol index is 1, and an allocation length of the PDSCH in the slot is 12 symbols.

For example, FIG. 9 is still used as an example. The network device may send the first DCI to the terminal device (where the terminal device is denoted as a terminal device 1) through the first PDCCH on the SS set 1. A resource of the SS set 2 is used for data scheduling, for example, for transmission of downlink scheduling data on a PDSCH. Alternatively, the network device may send the first DCI to the terminal device 1 through the first PDCCH on the SS set 2, and the network device sends the first DCI to the terminal device 1 or another terminal device through the first PDCCH on the SS set 1. The another terminal device and the terminal device 1 are located in a same cell. Herein, the network device chooses to send the first DCI to the terminal device 1 through the first PDCCH on the SS set 1, the SS set 2, or the SS set 1 and the SS set 2. This is equivalent to dynamically extending the symbol quantity of the first PDCCH from one symbol to two symbols. In other words, a time domain position of the first PDCCH may change, so that a capacity of the PDCCH can be adaptively adjusted.

Specifically, in a first manner, the network device sends the first DCI to the terminal device 1 through the first PDCCH on the SS set 2. Accordingly, the terminal device receives the first DCI from the network device through the first PDCCH on the SS set 2. Alternatively, in a second manner, the network device sends the first DCI to the terminal device 1 through the first PDCCH on the SS set 1 and the SS set 2. Accordingly, the terminal device receives the first DCI from the network device through the first PDCCH on the SS set 1 and the SS set 2. In the first manner and the second manner, the terminal device obtains the first PDCCH on the SS set 2 through monitoring, and performs S802. In a third manner, the network device sends the first DCI to the terminal device through the first PDCCH on the SS set 1. Accordingly, the terminal device receives the first DCI from the network device through the first PDCCH on the SS set 1. In other words, the terminal device obtains the first PDCCH on the SS set 1 through monitoring, but does not obtain the first PDCCH on the SS set 2 through monitoring. The terminal device is to perform S803. S802 and S803 are specifically described as follows.

S802: The terminal device determines a second time domain resource based on the time domain position of the first PDCCH and the first time domain resource.

The second time domain resource is mainly described from the following three points.

1. Function of the second time domain resource: The second time domain resource is used for data scheduling. That is, the second time domain resource is a time domain resource of a PUSCH, so that the terminal device sends data to the network device, or the second time domain resource is a time domain resource of the PDSCH, so that the terminal device receives data from the network device.

2. Start symbol position of the second time domain resource: There is an offset between the start symbol position of the second time domain resource and an end symbol position of the first PDCCH. In other words, the time domain resource for the data scheduling does not conflict with the time domain position of the first PDCCH. This can ensure data transmission, and help improve data transmission performance.

Optionally, a unit of a value of "an offset between the start symbol position of the second time domain resource and an end symbol position of the first PDCCH" is a symbol. Specifically, a time length of the symbol is determined based on a numerology of an active BWP of a scheduled cell, or is determined based on a subcarrier spacing (SCS) of the active BWP of the scheduled cell. For example, when the first PDCCH and the PDSCH are not on a same carrier, an SCS of the first PDCCH is different from an SCS of the PDSCH. In this way, there is also a difference between a time length of a symbol of the first PDCCH and a time length of a symbol of the PDSCH. For example, if the SCS of the PDSCH is 15 kHz, a time length of one symbol of the PDSCH is $1/15$ kHz, namely, approximately 66.67 μs. In this case, a time length of the unit of the value of the offset, namely, a time length of one symbol, is also $1/15$ kHz, namely, approximately 66.67 μs. For another example, if the SCS of the PDSCH is 30 kHz, a time length of one symbol of the PDSCH is $1/30$ kHz, namely, approximately 33.33 μs. In this case, a time length of the unit of the value of the offset, namely, a time length of one symbol, is also $1/30$ kHz, namely, approximately 33.33 μs.

Optionally, the value of "an offset between the start symbol position of the second time domain resource and an end symbol position of the first PDCCH" is an integer greater than 0. That is, the first symbol position after the end symbol position of the first PDCCH is a symbol position whose value of the offset is 1. For example, if the value of the offset is 1, the start symbol position of the second time domain resource is located after the end symbol position of the first PDCCH, and is adjacent to the end symbol position of the first PDCCH. If the value of the offset is 2, the start symbol position of the second time domain resource is located after the end symbol position of the first PDCCH, and there is one symbol between the start symbol position of the second time domain resource and the end symbol position of the first PDCCH. If the value of the offset is another value, the rest may be deduced by analogy.

It may be understood that the first symbol position after the end symbol position of the first PDCCH may alternatively be denoted as a symbol position whose value of the offset is 0. In this case, the value of "an offset between the start symbol position of the second time domain resource and an end symbol position of the first PDCCH" is an integer greater than or equal to 0. In this case, if the value of the offset is 0, the start symbol position of the second time domain resource is located after the end symbol position of the first PDCCH, and is adjacent to the end symbol position of the first PDCCH. If the value of the offset is 1, the start symbol position of the second time domain resource is located after the end symbol position of the first PDCCH, and there is one symbol between the start symbol position of the second time domain resource and the end symbol position of the first PDCCH. If the value of the offset is another value, the rest may be deduced by analogy.

The value of "an offset between the start symbol position of the second time domain resource and an end symbol position of the first PDCCH" may be obtained in the following two manners.

Manner 1: The value of the offset is determined in a predefined manner. In an actual application process, the manner may be, for example, but is not limited to the following three examples.

Example 1: The start symbol position of the second time domain resource is located after the end symbol position of the first PDCCH, and is adjacent to the end symbol position of the first PDCCH. That is, a start symbol of the second time domain resource immediately follows an end symbol of the first PDCCH. In other words, the value of the offset is predefined as 1.

Example 2: The start symbol position of the second time domain resource is located after the end symbol position of the first PDCCH, and a quantity of symbols between the start symbol position of the second time domain resource and the end symbol position of the first PDCCH is a preset value. In other words, both the network device and the terminal device determine by default that the value of the offset is the preset value. The preset value may be a positive integer greater than or equal to 0. For example, the preset value is 1, which indicates that a start symbol of the second time domain resource is located after an end symbol of the first PDCCH, and there is one symbol between the start symbol of the second time domain resource and the end symbol of the first PDCCH. For another example, the preset value is 2, which indicates that a start symbol of the second time domain resource is located after an end symbol of the first PDCCH, and there are two symbols between the start symbol of the second time domain resource and the end symbol of the first PDCCH.

Example 3: A value of "an offset between a start symbol position of the first time domain resource and an initial end symbol position of the first PDCCH" is used as the value of "an offset between the start symbol position of the second time domain resource and an end symbol position of the first PDCCH".

For example, the scenario in which "the first PDCCH occupies the symbol (the symbol 0) through initial configuration and the time domain resource assignment information set configured by the network device for the terminal device is Table 5" is still used as an example, and the terminal device obtains the first PDCCH on the SS set 2 through monitoring. The time domain position of the first PDCCH is the second symbol, namely, a symbol 1, in a slot. If a value of the first TDRA indicator field is any value from 0 to 5, the first time domain resource is a time domain resource indicated by one of groups of time domain resource assignment information whose row indexes are 1 to 6 in Table 5. In other words, the start symbol of the first time domain resource is also the second symbol, namely, the symbol 1, in the slot. However, the second symbol (namely, the symbol 1) in the slot has been occupied by the first PDCCH, and therefore cannot be used for data scheduling.

The terminal device uses the manner in Example 3. To be specific, if the terminal device determines that the value of "the offset between the start symbol position of the first time domain resource and the initially configured end symbol position of the first PDCCH" is 1, the value of "an offset between the start symbol position of the second time domain resource and an end symbol position of the first PDCCH" is also 1. In this way, the terminal device determines the start symbol position of the second time domain resource, namely, the first symbol (a symbol 2) after the end symbol position of the first PDCCH, based on "an end symbol position of the first PDCCH" and the value of the offset.

Manner 2: Indicate the value of "an offset between the start symbol position of the second time domain resource and an end symbol position of the first PDCCH".

For example, the network device sends offset indication information to the terminal device. Accordingly, the terminal device receives the offset indication information from the network device. The offset indication information is used to indicate the value of "an offset between the start symbol position of the second time domain resource and an end symbol position of the first PDCCH". In this way, the terminal device determines the start symbol position of the second time domain resource based on the offset indication information and the end symbol position of the first PDCCH.

3. Allocation Length of the Second Time Domain Resource:

The allocation length of the second time domain resource is a quantity of consecutive symbols occupied in one slot during data scheduling. The allocation length of the second time domain resource may be the same as or different from an allocation length of the first time domain resource.

Manners of determining the allocation length of the second time domain resource may be, for example, but are not limited to, the following two manners:

Manner 1: The terminal device determines the allocation length of the second time domain resource based on the end symbol position of the first PDCCH, the initially configured end symbol position of the first PDCCH, and the allocation length of the first time domain resource. The allocation length of the second time domain resource is denoted as L2, and the allocation length of the first time domain resource is denoted as L1.

For example, the scenario in which "the first PDCCH occupies the symbol (the symbol 0) through initial configuration and the time domain resource assignment information set configured by the network device for the terminal device is Table 5" is still used as an example. If the value of the four bits of the first TDRA indicator field is "0001", the allocation length of the first time domain resource is 12 symbols based on the time domain resource assignment information whose row index is 2 in Table 5, that is, L1=12. The terminal device obtains the first PDCCH on the SS set 2 through monitoring. The end symbol position of the first PDCCH is the second symbol, namely, the symbol 1, in the slot. The initially configured end symbol position of the first PDCCH is the first symbol, namely, the symbol 0, in the slot. In other words, a difference (denoted as Δ) between "the end symbol position of the first PDCCH" and "the initially configured end symbol position of the first PDCCH" is 1, that is, one symbol. This is denoted as Δ=1. L2 and L1 satisfy the following relationship:

$$L2 = L1 - k \times \Delta \quad (2)$$

L2 represents the allocation length of the second time domain resource, L1 represents the allocation length of the first time domain resource, k represents a coefficient, and Δ represents the difference between "the end symbol position of the first PDCCH" and "the initially configured end symbol position of the first PDCCH". The coefficient k is a positive integer greater than or equal to 1 and less than a maximum symbol index of a slot.

For example, based on the formula (2), a value of L1, a value of Δ, and the predefined coefficient k=1, the terminal device determines that L2=11, that is, the allocation length of the second time domain resource is 11 symbols.

It should be noted that in the foregoing relationship in S802 in this embodiment of this application, the coefficient k may alternatively be another value, and the value of Δ is an integer greater than 0. In other words, "the end symbol position of the first PDCCH" is different from "the initial end symbol position of the first PDCCH". When the symbol quantity of the first PDCCH dynamically changes from one symbol to two symbols, "the end symbol position of the first PDCCH" is located after "the initial end symbol position of the first PDCCH".

It may be understood that the value of Δ may alternatively be an integer less than 0.

In this case, the foregoing formula (2) may be expressed as:

$$L2 = L1 + k \times \Delta \quad (3)$$

Manner 2: The terminal device determines the allocation length of the second time domain resource based on the start symbol position of the second time domain resource and the allocation length of the first time domain resource.

For example, one slot includes 14 symbols (namely, a symbol 0 to a symbol 13). The start symbol of the first time domain resource is the symbol 1, the allocation length is six symbols (that is, L1=6), and the start symbol of the second time domain resource is the symbol 9. The symbol 9 to the symbol 13 are five symbols, and a length thereof is less than L1. In this case, the terminal device determines that the allocation length of the second time domain resource is 5.

For another example, one slot still includes 14 symbols (namely, a symbol 0 to a symbol 13). The start symbol of the first time domain resource is the symbol 1, the allocation length is six symbols (that is, L1=6), and the start symbol of the second time domain resource is the symbol 3. The symbol 3 to the symbol 13 are 11 symbols, and a length thereof is greater than L1. In this case, the terminal device determines that the allocation length of the second time domain resource is equal to the allocation length of the first time domain resource.

There may be the following two results of comparing the allocation length of the second time domain resource with the allocation length of the first time domain resource:

Result 1: The allocation length of the second time domain resource is less than the allocation length of the first time domain resource.

For example, when determining the allocation length of the second time domain resource, the terminal device uses the foregoing manner 1, that is, determines the allocation length of the second time domain resource by using the formula (2). In this case, the allocation length of the second time domain resource is less than the allocation length of the first time domain resource.

For another example, when determining the allocation length of the second time domain resource, the terminal device uses the foregoing manner 2, and a part of symbol indexes in a preliminarily determined value range are greater than a threshold. In this case, the allocation length of the second time domain resource is also less than the allocation length of the first time domain resource.

Result 2: The allocation length of the second time domain resource is equal to the allocation length of the first time domain resource.

For example, when determining the allocation length of the second time domain resource, the terminal device uses the foregoing manner 2, and all of symbol indexes in a preliminarily determined value range are less than or equal to a threshold. In this case, the allocation length of the second time domain resource is equal to the allocation length of the first time domain resource.

In S802, that the first time domain resource is different from the second time domain resource may be specifically presented as the following two cases:

Case 1: The start symbol position of the first time domain resource is different from the start symbol position of the second time domain resource, and the allocation length of the first time domain resource is the same as the allocation length of the second time domain resource.

Case 2: The start symbol position of the first time domain resource is different from the start symbol position of the second time domain resource, and the allocation length of the first time domain resource is different from the allocation length of the second time domain resource.

In the foregoing two cases, optionally, "a mapping type that is of data and that is used for the first time domain resource" is the same as "a mapping type that is of data and that is used for the second time domain resource".

In a possible implementation, S802 may be specifically implemented as follows: If the end symbol position of the first PDCCH overlaps the first time domain resource, the second time domain resource is determined based on the end symbol position of the first PDCCH.

For example, "the end symbol position of the first PDCCH overlaps the first time domain resource" may mean that the end symbol of the first PDCCH is included in the first time domain resource. Optionally, when determining the start symbol position of the second time domain resource, the terminal device determines the start symbol position of the second time domain resource based on the end symbol position of the first PDCCH and the value of "an offset between the start symbol position of the second time domain resource and an end symbol position of the first PDCCH". For the manners of obtaining the value of "an offset between the start symbol position of the second time domain resource and an end symbol position of the first PDCCH", refer to the related descriptions in "a second point". Details are not described herein again. For the manners of determining the allocation length of the second time domain resource by the terminal device, refer to the related descriptions in "a third point". Details are not described herein again. Optionally, the terminal device uses the mapping type that is of the data and that is used for the first time domain resource as the mapping type that is of the data and that is used for the second time domain resource.

In this way, even if the end symbol position of the first PDCCH overlaps the first time domain resource, the terminal device can determine the second time domain resource, to perform data scheduling. This avoids a conventional-technology phenomenon that "because the end symbol position of the first PDCCH overlaps the first time domain resource, the terminal device cannot determine the time domain resource used for the data scheduling". Flexibility of time domain resource assignment is high.

Optionally, S803: The terminal device uses the first time domain resource as the second time domain resource. In other words, the terminal device uses the first time domain resource indicated by the first TDRA indicator field as the time domain resource used for the data scheduling.

For example, the scenario in which "the time domain resource assignment information set is Table 5 and the value of the four bits of the first TDRA indicator field is 0001" is still used as an example. The time domain resource for the data scheduling is the time domain resource indicated by the time domain resource assignment information whose row index is 2 in Table 5.

Optionally, S804: The terminal device sends data to the network device on the second time domain resource. Accordingly, the network device receives the data from the terminal device on the second time domain resource. Alternatively, the network device sends data to the terminal device on the second time domain resource. Accordingly, the terminal device receives the data from the network device on the second time domain resource.

In the communication method in this embodiment of this application, the second time domain resource used for the data scheduling is determined based on the time domain position of the first PDCCH and the first time domain resource, and is different from the first time domain resource. Even if the time domain position of the first PDCCH dynamically changes, for example, the time domain position of the first PDCCH overlaps the first time domain resource, the terminal device can determine, based on the time domain position of the first PDCCH and the first time domain resource, the second time domain resource used for the data scheduling, to implement flexible matching of a scheduling resource.

Optionally, to further improve efficiency and accuracy of "determining the second time domain resource by the terminal device", the network device sets an enabling switch, to control whether the terminal device determines the second time domain resource based on the time domain position of the first PDCCH. In a possible implementation, refer to FIG. 10. The communication method in this embodiment of this application further includes the following step.

Optionally, S805: The network device sends first indication information to the terminal device. Accordingly, the terminal device receives the first indication information from the network device.

The first indication information may be carried in RRC signaling, a media access control (MAC) control element (CE), or third DCI. The third DCI and the first DCI may be same DCI, or may be different DCI. The first indication information can indicate the terminal device to determine the second time domain resource based on the time domain position of the first PDCCH and the first time domain resource.

Optionally, whether the first indication information exists can indicate whether the terminal device determines the second time domain resource based on the time domain position of the first PDCCH and the first time domain resource. For example, if the terminal device receives the first indication information, the terminal device performs S802. If the terminal device does not receive the first indication information, the terminal device performs S803.

Optionally, a value indicated by the first indication information can indicate the terminal device to determine the second time domain resource based on the time domain position of the first PDCCH and the first time domain resource. For example, when the value indicated by the first indication information is a first preset value, the terminal device performs S802. When the value indicated by the first indication information is not a first preset value, the terminal device performs S803.

In this way, the terminal device determines the second time domain resource based on the first indication information.

It should be noted that a sequence of performing S800 and S805 is not limited in this embodiment of this application. To be specific, S800 may be performed before S805, S805 may be performed before S800, or S800 and S805 may be simultaneously performed. A sequence of performing S801 and S805 is not limited in this embodiment of this application. To be specific, S801 may be performed before S805, S805 may be performed before S801, or S801 and S805 may be simultaneously performed.

In addition, if in S800, a plurality of search spaces are configured by using the first configuration information, and no other information indication is performed, the terminal device performs PDCCH blind detection in each search space at a position at which a PDCCH may occur, for example, the terminal device performs PDCCH blind detection at both a position of the SS set 1 and a position of the SS set 2 shown in FIG. 9. However, a quantity of times the terminal device performs PDCCH blind detection in a time unit (for example, in a slot) may be limited. To reduce a quantity of times of PDCCH blind detection of the terminal device and improve PDCCH blind detection efficiency, the network device indicates, to the terminal device, search spaces or a specific search space that is in the plurality of search spaces and in which PDCCH blind detection needs to be performed. In a possible implementation, refer to FIG. 10. The communication method in this embodiment of this application further includes the following step.

Optionally, S806: The network device sends second indication information to the terminal device. Accordingly, the terminal device receives the second indication information from the network device.

The second indication information indicates at least one search space in the plurality of search spaces, so that the terminal device receives the first DCI from the network device through the first PDCCH in the at least one search space indicated by the second indication information, instead of receiving the first DCI from the network device through the first PDCCH in each of the plurality of search spaces.

After the terminal device performs S806, a specific implementation of performing S801 may be as follows: The terminal device receives the first DCI from the network device through the first PDCCH in the at least one search space indicated by the second indication information, and does not need to receive the first DCI in each of the plurality of search spaces.

Content indicated by the second indication information may be, for example, but not limited to, the following four examples:

Example 1: The second indication information indicates statuses of the plurality of search spaces, for example, indicates that a status of a search space in the plurality of search spaces is an active state or an inactive state. If the search space is in the active state, it indicates that the terminal device monitors the first PDCCH in the search space. If the search space is in the inactive state, it indicates that the terminal device does not need to monitor the first PDCCH in the search space. After performing S806, the terminal device receives the first DCI from the network device through the first PDCCH in the active search space indicated by the second indication information, and does not need to receive the first DCI in each of the plurality of search spaces. After performing S806, the terminal device receives or sends data in a BWP in an active state in a cell in which the second indication information is sent. A serving cell is the cell in which the second indication information is sent, and a BWP is the BWP in the active state in the cell in which the second indication information is sent.

For example, the plurality of search spaces may be 10 search spaces, and indexes of the search spaces are 0 to 9, and are denoted as an SS 0 to an SS 9. The second indication information includes 10 bits. Each bit corresponds to one search space. If a value of a bit is 1, it indicates that a search space corresponding to the bit is in the active state. That is, the terminal device monitors the first PDCCH in the search space corresponding to the bit. If a value of a bit is 0, it indicates that a search space corresponding to the bit is in the inactive state. That is, the terminal device does not need to monitor the first PDCCH in the search space corresponding to the bit. Alternatively, if a value of a bit is 0, it indicates that a search space corresponding to the bit is in the active state; or if a value of a bit is 1, it indicates that a search space corresponding to the bit is in the inactive state.

Example 2: The second indication information further indicates information about a BWP in addition to indicating "a state of each of the plurality of search spaces". The information about the BWP may be an identifier (ID) of an active BWP. After performing S806, the terminal device receives or sends data in the BWP in a cell in which the second indication information is sent. A serving cell is a cell in which the second indication information is sent.

Example 3: The second indication information further indicates information about a serving cell in addition to indicating "a state of each of the plurality of search spaces". The serving cell may be a scheduling cell, or may be a scheduled cell. The information about the serving cell may be an identifier (ID) of the serving cell, or may be an index of the serving cell. The information about the serving cell may be complete information about the serving cell. For example, five bits are used to indicate any one of the 32 cells. The information about the serving cell may alternatively be simplified information about the serving cell. For example, the scheduled cell is identified by using a CIF. In a case of self-scheduling, the value of the CIF is zero. After performing S806, the terminal device receives or sends data in a BWP in an active state in the serving cell.

Example 4: The second indication information further indicates information about a serving cell and information about a BWP in addition to indicating "a state of each of the plurality of search spaces". For descriptions of "information about a BWP", refer to the related descriptions of Example 2. For descriptions of "information about a serving cell", refer to the related descriptions of Example 3. Details are not described herein again.

Optionally, the second indication information is carried in a MAC CE. Example 4 is used as an example. To be specific, the second indication information includes a search space status indication, an identifier of the serving cell, and an identifier of the BWP. For example, refer to FIG. 11. A group of information fields of the MAC CE includes the search space status indication, the identifier of the serving cell, and the identifier of the BWP. The plurality of search spaces are search spaces whose indexes are 0 to 9, and are denoted as an $SS_0$ to an $SS_9$. Different bits correspond to search spaces of different indexes. If a value of a bit is 1, it indicates that a search space corresponding to the bit is in the active state. That is, the terminal device monitors the first PDCCH in the search space corresponding to the bit. If a value of a bit is 0, it indicates that a search space corresponding to the bit is in the inactive state. That is, the terminal device does not need to monitor the first PDCCH in the search space corresponding to the bit. The identifier of the serving cell includes five bits, and can indicate any one of a maximum of 32 cells. The identifier of the BWP occupies two bits, and can indicate a BWP in an active state in a maximum of four BWPs. In addition, in a carrier aggregation scenario, when the terminal device has a plurality of cells, or there are a plurality of BWPs in one cell, there may be a plurality of groups of information fields.

Optionally, the second indication information is carried in fourth DCI. The fourth DCI and the first DCI may be same DCI, or may be different DCI.

In the foregoing embodiment, a scenario in which "a time domain resource assignment information set is preconfigured" is used as an example to describe a time domain resource assignment process of dynamic data scheduling. In an actual application process, there may alternatively be a plurality of preconfigured time domain resource assignment information sets. In this case, refer to FIG. 12. A communication method in an embodiment of this application includes the following steps.

Optionally, S1200: A network device sends second configuration information to a terminal device. Accordingly, the terminal device receives the second configuration information from the network device.

The second configuration information may include information for configuring a plurality of time domain resource assignment information sets in a BWP. Optionally, different time domain resource assignment information sets correspond to different symbol positions occupied by a second PDCCH. Downlink data scheduling is used as an example. When the second PDCCH occupies one symbol (a symbol 0) in a slot, a time domain resource assignment information set is configured as Table 6.

TABLE 6

| Row index | Mapping type of data | $K_o$ | S | L |
|---|---|---|---|---|
| 1 | Type A | 0 | 1 | 13 |
| 2 | Type A | 0 | 1 | 12 |
| 3 | Type A | 0 | 1 | 11 |
| 4 | Type A | 0 | 1 | 10 |
| 5 | Type A | 0 | 1 | 9 |
| 6 | Type A | 0 | 1 | 8 |
| 7 | Type A | 0 | 1 | 7 |
| 8 | Type A | 0 | 1 | 6 |

For another example, when the second PDCCH occupies two symbols (a symbol 0 and a symbol 1) in a slot, or when the second PDCCH occupies one symbol (the symbol 1) in the slot, a time domain resource assignment information set is configured as Table 7.

TABLE 7

| Row index | Mapping type of data | $K_o$ | S | L |
|---|---|---|---|---|
| 1 | Type A | 0 | 2 | 13 |
| 2 | Type A | 0 | 2 | 12 |
| 3 | Type A | 0 | 2 | 11 |
| 4 | Type A | 0 | 2 | 10 |
| 5 | Type A | 0 | 2 | 9 |
| 6 | Type A | 0 | 2 | 8 |
| 7 | Type A | 0 | 2 | 7 |
| 8 | Type A | 0 | 2 | 6 |

For related descriptions of "a time domain resource assignment information set", refer to the foregoing related descriptions of the "time domain resource assignment". Details are not described herein again.

The second configuration information may further include information for configuring a search space.

For example, in one BWP, the network device configures at least two search spaces for the terminal device, and the at least two search spaces are denoted as a search space set 1 (SS set 1) and a search space set 2 (SS set 2). The SS set 1 indicates the terminal device to monitor the second PDCCH on a symbol 0 in a slot, and the SS set 2 indicates the terminal device to monitor the second PDCCH on a symbol 1 in the slot.

S1201: The network device sends second DCI to the terminal device through the second PDCCH. Accordingly, the terminal device receives the second DCI from the network device through the second PDCCH.

The second DCI includes a second TDRA indicator field, and a value indicated by the second TDRA indicator field corresponds to a plurality of third time domain resources. For example, when a value of four bits of the second TDRA indicator field is "0001", a corresponding row index is 2. There are the plurality of preconfigured time domain resource assignment information sets. In other words, there are a plurality of groups of time domain resource assignment information whose row index is 2, and each group of time domain resource assignment information corresponds to one third time domain resource. In this way, there are the plurality of third time domain resources corresponding to the value indicated by the second TDRA indicator field.

S1202: The terminal device obtains a fourth time domain resource.

The fourth time domain resource is used for data scheduling. That is, the fourth time domain resource is a time domain resource of a PUSCH, so that the terminal device sends data to the network device, or the fourth time domain resource is a time domain resource of a PDSCH, so that the terminal device receives data from the network device.

There is a correspondence between the fourth time domain resource and a time domain position of the second PDCCH, and the fourth time domain resource is one of the plurality of third time domain resources.

Optionally, a specific implementation process in which the terminal device obtains the fourth time domain resource includes: The terminal device determines the fourth time domain resource based on the time domain position of the second PDCCH and the value indicated by the second TDRA indicator field. Because the time domain resource assignment information set may be configured based on the symbol position occupied by the second PDCCH, there is a correspondence between "the time domain resource assignment information set" and "the symbol position occupied by the second PDCCH". In other words, "the time domain position of the second PDCCH for transmitting the second DCI" can indicate one time domain resource assignment information set. With reference to the value indicated by the second TDRA indicator field, one third time domain resource may be then determined in the plurality of third time domain resources as the fourth time domain resource.

For example, the downlink data scheduling is still used as an example. If the time domain position of the second PDCCH is a symbol 0 in a slot, and does not occupy another symbol in the slot, when the terminal device determines the fourth time domain resource, a referenced time domain resource assignment information set is configured as Table 6. When the value of the four bits of the second TDRA indicator field is "0001", the corresponding row index is 2, and the fourth time domain resource is a time domain resource indicated by the time domain resource assignment information whose row index is 2 in Table 6.

If the time domain position of the second PDCCH is a symbol 0 and a symbol 1 in a slot, and does not occupy another symbol in the slot, when the terminal device determines the fourth time domain resource, a referenced time domain resource assignment information set is configured as Table 7. When the value of the four bits of the second TDRA indicator field is "0001", the corresponding row index is 2, and the fourth time domain resource is a time domain resource indicated by the time domain resource assignment information whose row index is 2 in Table 7.

S1203: The terminal device sends data to the network device on the fourth time domain resource. Accordingly, the network device receives the data from the terminal device on the fourth time domain resource. Alternatively, the network device sends data to the terminal device on the fourth time domain resource. Accordingly, the terminal device receives the data from the network device on the fourth time domain resource.

In the communication method in this embodiment of this application, the value indicated by the second TDRA indicator field corresponds to the plurality of third time domain resources instead of one third time domain resource. Even if the time domain position of the second PDCCH does not satisfy a time domain resource used for dynamic data scheduling, for example, the time domain position of the second PDCCH overlaps one of the plurality of third time domain resources, the terminal device can determine, based on the time domain position of the second PDCCH, the fourth time domain resource used for the data scheduling, to improve flexible matching of a scheduling resource.

Optionally, to further improve efficiency and accuracy of "determining the fourth time domain resource by the terminal device", the network device may further indicate a correspondence between the time domain position of the second PDCCH and the time domain resource assignment information set to the terminal device, so that the terminal device accurately selects one time domain resource assignment information set from a plurality of time domain resource assignment information sets, to determine the fourth time domain resource. In a possible implementation, refer to FIG. 13. The communication method in this embodiment of this application further includes the following step.

Optionally, S1204: The network device sends correspondence indication information to the terminal device. Accordingly, the terminal device receives the correspondence indication information from the network device.

The correspondence indication information indicates the correspondence between the time domain position of the second PDCCH and the time domain resource assignment information set. For example, the correspondence indication information indicates a correspondence between a search space of the second PDCCH and the time domain resource assignment information set. The downlink data scheduling is still used as an example. The correspondence indication information indicates that there is a correspondence between the SS set 1 and Table 6, and there is a correspondence between the SS set 2 and Table 7.

In this way, based on the correspondence indication information, if the terminal device receives the second DCI through the second PDCCH on the SS set 1, the terminal device determines the fourth time domain resource in the plurality of groups of time domain resource assignment information shown in Table 6; or if the terminal device receives the second DCI through the second PDCCH on the SS set 2, the terminal device determines the fourth time domain resource in the plurality of groups of time domain resource assignment information shown in Table 7. In this way, the terminal device can accurately select a time domain resource assignment information set, to determine the fourth time domain resource, so that accuracy of determining the fourth time domain resource is improved.

It should be noted that a sequence of performing S1201 and S1204 is not limited in this embodiment of this application. To be specific, S1201 may be performed before S1204, S1204 may be performed before S1201, or S1201 and S1204 may be simultaneously performed. Optionally, in another possible implementation, refer to FIG. 13. The communication method in this embodiment of this application further includes the following step.

Optionally, S1205: The network device sends third indication information to the terminal device. Accordingly, the terminal device receives the third indication information from the network device.

The third indication information may be carried in RRC signaling, a media access control (MAC) control element (CE), or fifth DCI. The fifth DCI and the second DCI may be same DCI, or may be different DCI. The third indication information can indicate the terminal device to obtain, based on the time domain position of the second PDCCH, the fourth time domain resource indicated by the second TDRA indicator field.

Optionally, whether the third indication information exists can indicate whether the terminal device determines the fourth time domain resource based on the time domain position of the second PDCCH. For example, if the terminal device receives the third indication information, the fourth time domain resource is related to the time domain position of the second PDCCH. If the terminal device does not receive the third indication information, the fourth time domain resource is not related to the time domain position of the second PDCCH.

Optionally, a value indicated by the third indication information can indicate the terminal device to determine the fourth time domain resource based on the time domain position of the second PDCCH. For example, when the value indicated by the third indication information is a second preset value, the fourth time domain resource is related to the time domain position of the second PDCCH. When the value indicated by the third indication information is not a second preset value, the fourth time domain resource is not related to the time domain position of the second PDCCH.

In this way, the terminal device determines the fourth time domain resource based on the third indication information.

It should be noted that a sequence of performing S1201 and S1205 is not limited in this embodiment of this application. To be specific, S1201 may be performed before S1205, S1205 may be performed before S1201, or S1201 and S1205 may be simultaneously performed.

In addition, a plurality of search spaces may be configured by using the second configuration information in S1200. To reduce a quantity of times of PDCCH blind detection of the terminal device and improve PDCCH blind detection efficiency, the network device indicates, to the terminal device, search spaces or a specific search space that is in the plurality of search spaces and in which PDCCH blind detection needs to be performed.

Figure 13:
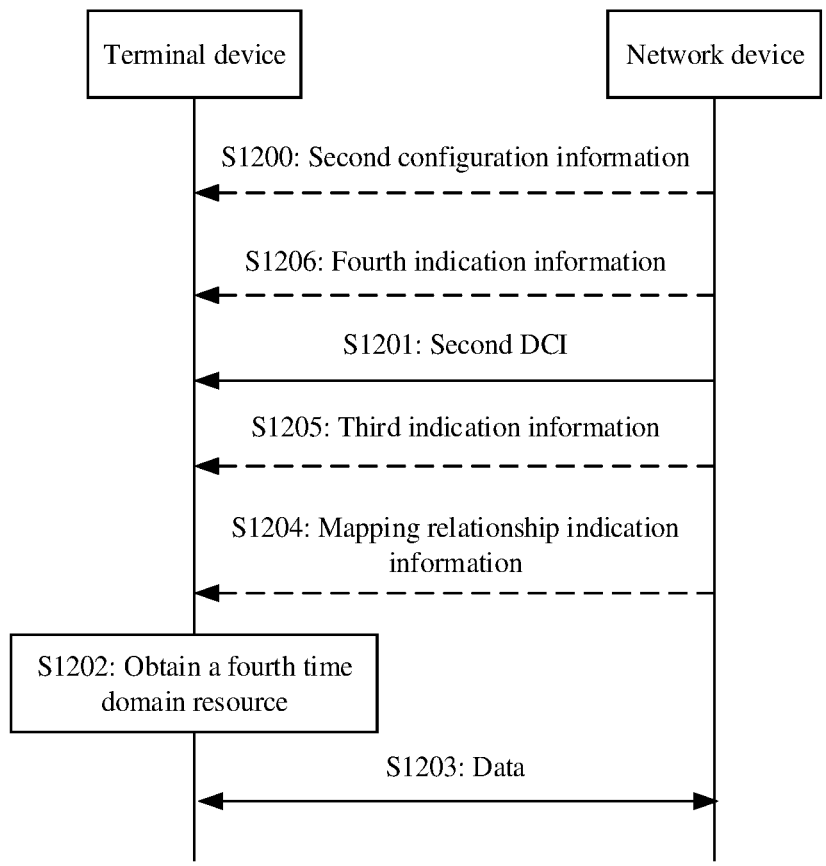
FIG. 13 is a schematic flowchart of another communication method according to an embodiment of this application.

In a possible implementation, refer to FIG. 13. The communication method in this embodiment of this application further includes the following step.

Optionally, S1206: The network device sends fourth indication information to the terminal device. Accordingly, the terminal device receives the fourth indication information from the network device.

The fourth indication information indicates at least one search space in the plurality of search spaces, so that the terminal device receives the second DCI from the network device through the second PDCCH in the at least one search space indicated by the fourth indication information instead of receiving the second DCI from the network device through the second PDCCH in each of the plurality of search spaces.

After the terminal device performs S1206, a specific implementation of performing S1201 may be as follows: The network device sends the second DCI to the terminal device through the second PDCCH in the at least one search space indicated by the fourth indication information. Accordingly, the terminal device receives the second DCI from the network device through the second PDCCH in the at least one search space indicated by the fourth indication information, and does not need to receive the second DCI in each of the plurality of search spaces.

The fourth indication information may further indicate information about a serving cell and/or information about a BWP. For details, refer to the related descriptions in S806. Details are not described herein again.

Corresponding to the methods provided in the foregoing method embodiments, embodiments of this application further provide corresponding apparatuses. The apparatus includes a corresponding module configured to perform the foregoing embodiment. The module may be software, hardware, or a combination of software and hardware.

Figure 14:
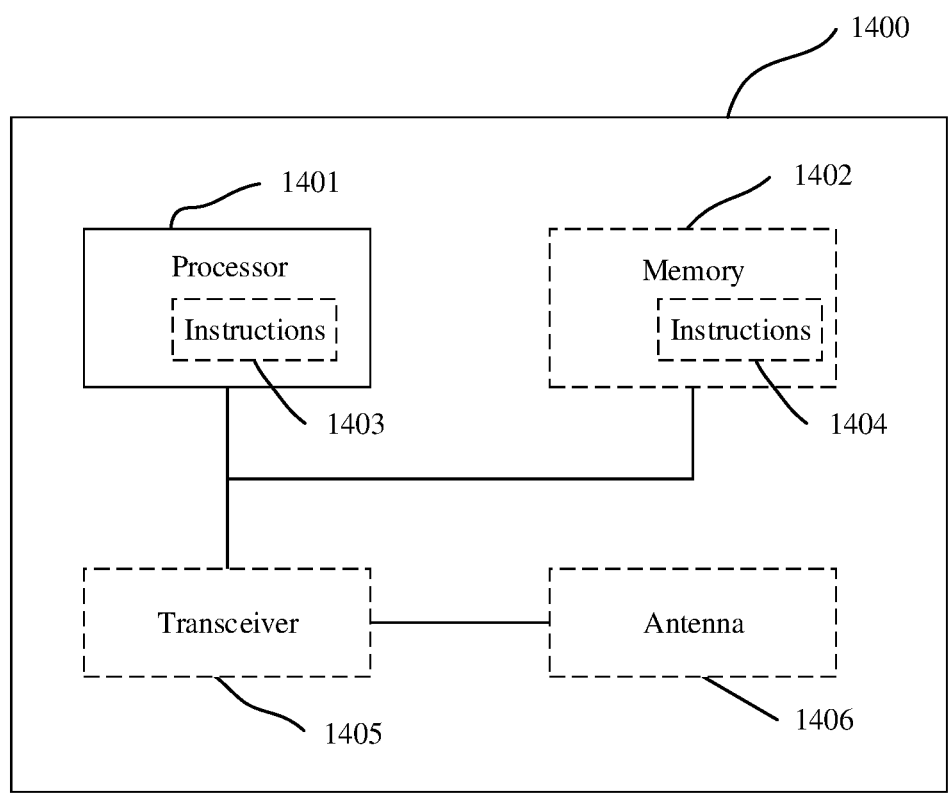
FIG. 14 is a schematic diagram of a structure of a communication apparatus according to an embodiment of this application.

FIG. 14 is a schematic diagram of a structure of an apparatus. The apparatus 1400 may be a network device, may be a terminal device, may be a chip, a chip system, a processor, or the like that supports the network device in implementing the foregoing method, or may be a chip, a chip system, a processor, or the like that supports the terminal device in implementing the foregoing method. The apparatus may be configured to implement the method described in the foregoing method embodiment. For details, refer to the descriptions in the foregoing method embodiment.

The apparatus 1400 may include one or more processors 1401. The processor 1401 may also be referred to as a processing unit, and may implement a control function. The processor 1401 may be a general-purpose processor, a dedicated processor, or the like. For example, the processor 1401 may be a baseband processor or a central processing unit. The baseband processor may be configured to process a communication protocol and communication data. The central processing unit may be configured to control the communication apparatus (for example, a base station, a baseband chip, a terminal device, a terminal device chip, a DU, or a CU), execute a software program, and process data of the software program.

In an optional design, the processor 1401 may alternatively store instructions and/or data 1403, and the instructions and/or data 1403 may be run by the processor, to enable the apparatus 1400 to perform the method described in the foregoing method embodiment.

In another optional design, the processor 1401 may include a transceiver unit configured to implement receiving and sending functions. For example, the transceiver unit may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code or data. Alternatively, the transceiver circuit, the interface, or the interface circuit may be configured to transmit or transfer a signal.

In still another possible design, the apparatus 1400 may include a circuit, and the circuit may implement the sending, receiving, or communication function in the foregoing method embodiment.

Optionally, the apparatus 1400 may include one or more memories 1402. The memory stores instructions 1404, and the instructions may be run on the processor, so that the apparatus 1400 performs the method described in the foregoing method embodiment. Optionally, the memory may further store data. Optionally, the processor may also store instructions and/or data. The processor and the memory may be separately disposed, or may be integrated together. For example, the correspondence described in the foregoing method embodiment may be stored in the memory or stored in the processor.

Optionally, the apparatus 1400 may further include a transceiver 1405 and/or an antenna 1406. The processor 1401 may be referred to as a processing unit, and control the apparatus 1400. The transceiver 1405 may be referred to as a transceiver unit, a transceiver circuit, a transceiver apparatus, a transceiver module, or the like, and is configured to implement a transceiver function.

Optionally, the apparatus 1400 in this embodiment of this application may be configured to perform the method described in FIG. 8, FIG. 10, FIG. 12, or FIG. 13 in embodiments of this application, or may be configured to perform a method in which the methods described in the foregoing two or more figures are combined.

The processor and the transceiver that are described in this application may be implemented on an integrated circuit (IC), an analog IC, a radio frequency integrated circuit RFIC, a hybrid signal IC, an application specific integrated circuit (ASIC), a printed circuit board (PCB), an electronic device, or the like. The processor and the transceiver may also be fabricated by using various IC process technologies, for example, a complementary metal oxide semiconductor (CMOS), an n-type metal oxide semiconductor (NMOS), a positive channel metal oxide semiconductor (PMOS), a bipolar junction transistor (BJT), a bipolar CMOS (BiCMOS), silicon germanium (SiGe), and gallium arsenide (GaAs).

The apparatus described in the foregoing embodiment may be the network device or the terminal device. However, a range of the apparatus described in this application is not limited thereto, and a structure of the apparatus may not be limited to FIG. 14. The apparatus may be an independent device, or may be a part of a large device. For example, the apparatus may be:

(1) an independent integrated circuit IC, a chip, or a chip system or subsystem;
(2) a set of one or more ICs, where optionally, the IC set may also include a storage component configured to store data and/or instructions;
(3) an ASIC, for example, a modem (MSM);
(4) a module that can be embedded in another device;
(5) a receiver, a terminal device, an intelligent terminal, a cellular phone, a wireless device, a handheld device, a mobile unit, a vehicle-mounted device, a network device, a cloud device, an artificial intelligence device, a machine device, a household device, a medical device, an industrial device, and the like; and
(6) another device, or the like.

Figure 15:
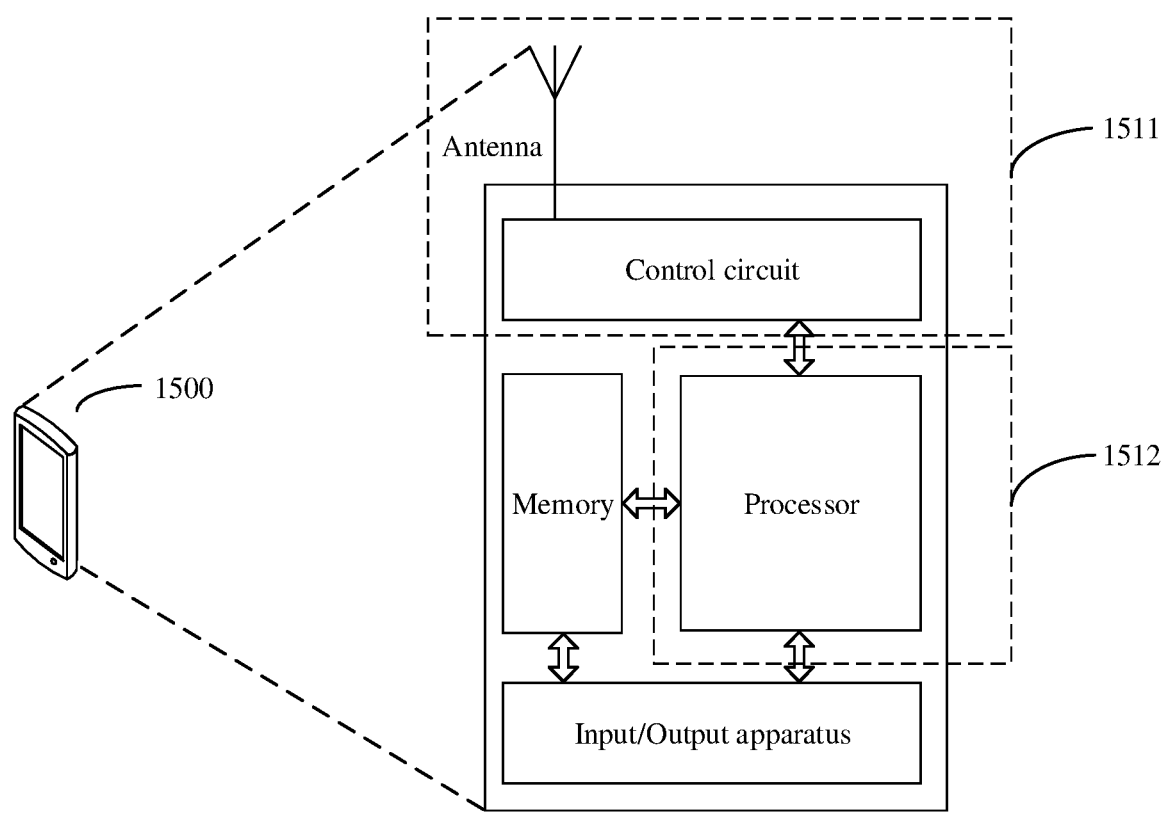
FIG. 15 is a schematic diagram of a structure of a terminal device according to an embodiment of this application.

FIG. 15 is a schematic diagram of a structure of a terminal device. The terminal device may be used in the scenario shown in FIG. 7. For ease of description, FIG. 15 shows only main components of the terminal device. As shown in FIG. 15, the terminal device 1500 includes a processor, a memory, a control circuit, an antenna, and an input/output apparatus. The processor is mainly configured to: process a communication protocol and communication data, control the entire terminal device, execute a software program, and process data of the software program. The memory is mainly configured to store the software program and the data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, such as a touchscreen, a display, or a keyboard, is mainly configured to receive data input by a user, and output data to the user.

After the terminal device is powered on, the processor may read a software program in a storage unit, parse and execute instructions of the software program, and process data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in an electromagnetic wave form by using the antenna. When data is sent to the terminal device, the radio frequency circuit receives the radio frequency signal by using the antenna, further converts the radio frequency signal into a baseband signal, and outputs the baseband signal to the processor. The processor converts the baseband signal into data, and processes the data.

For ease of description, FIG. 15 shows only one memory and one processor. An actual terminal device may include a plurality of processors and a plurality of memories. The memory may also be referred to as a storage medium, a storage device, or the like. This is not limited in this embodiment of the present application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. Functions of the baseband processor and the central processing unit are integrated into the processor in FIG. 15. A person skilled in the art may understand that the baseband processor and the central processing unit may be independent processors, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be embedded in the processor, or may be stored in the storage unit in a form of the software program. The processor executes the software program to implement a baseband processing function.

In an example, the antenna and the control circuit that have a transceiver function may be considered as a transceiver unit 1511 of the terminal device 1500, and the processor that has a processing function may be considered as a processing unit 1512 of the terminal device 1500. As shown in FIG. 15, the terminal device 1500 includes the transceiver unit 1511 and the processing unit 1512. The transceiver unit may also be referred to as a transceiver, a transceiver apparatus, or the like. Optionally, a component that is in the transceiver unit 1511 and that is configured to implement a receiving function may be considered as a receiving unit, and a component that is in the transceiver unit 1511 and that is configured to implement a sending function may be considered as a sending unit. That is, the transceiver unit 1511 includes the receiving unit and the sending unit. For example, the receiving unit may also be referred to as a receiver, a receiver circuit, and the like, and the sending unit may also be referred to as a transmitter, a transmitter circuit, or the like. Optionally, the receiving unit and the sending unit may be one integrated unit, or may be a plurality of independent units. The receiving unit and the sending unit may be in one geographical position, or may be distributed in a plurality of geographical positions.

Figure 16:
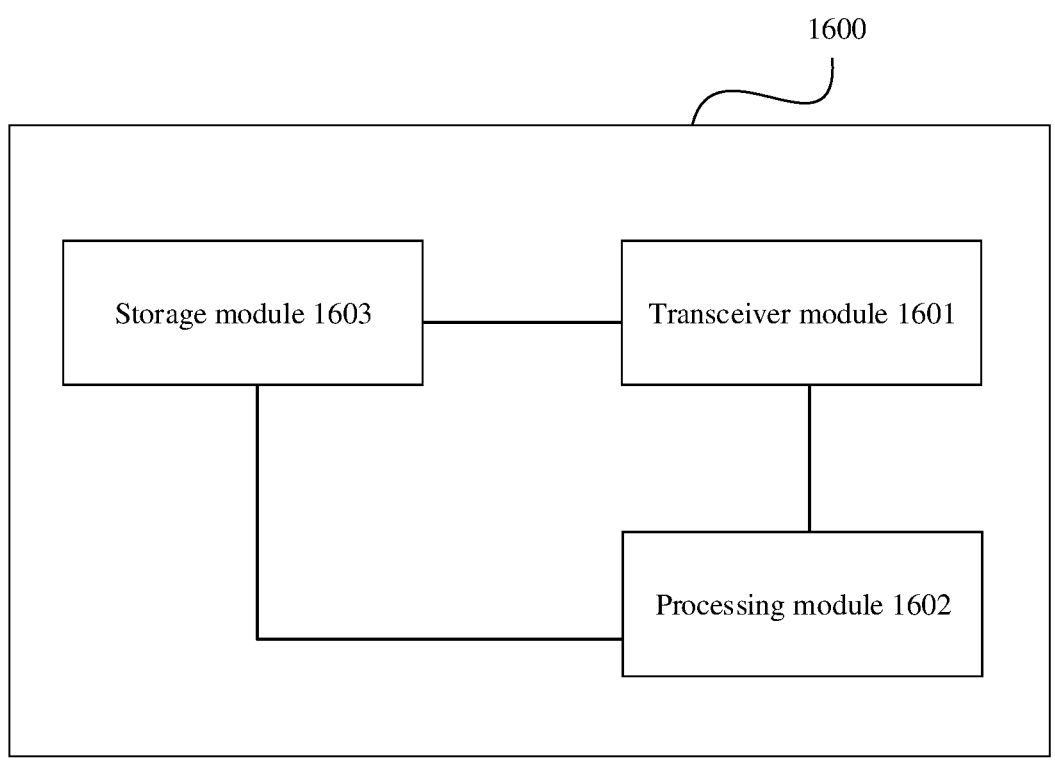
FIG. 16 is a schematic diagram of a structure of another communication apparatus according to an embodiment of this application.

As shown in FIG. 16, another embodiment of this application provides an apparatus 1600. The apparatus may be a terminal device, or may be a component (for example, an integrated circuit or a chip) of the terminal device. Alternatively, the apparatus may be a network device, or may be a component (for example, the integrated circuit or the chip) of the network device. Alternatively, the apparatus may be another communication module configured to implement the method in the method embodiment of this application. The apparatus 1600 may include a processing module 1602 (or referred to as a processing unit). Optionally, the apparatus 1600 may further include a transceiver module 1601 (or referred to as a transceiver unit) and a storage module 1603 (or referred to as a storage unit).

In a possible design, one or more modules in FIG. 16 may be implemented by one or more processors, may be implemented by one or more processors and one or more memories, may be implemented by one or more processors and one or more transceivers, or may be implemented by one or more processors, one or more memories, and one or more transceivers. This is not limited in this embodiment of this application. The processor, the memory, and the transceiver may be disposed separately, or may be integrated.

The apparatus has a function of implementing the terminal device described in embodiments of this application. For example, the apparatus includes a corresponding module, unit, or means used by the terminal device to perform the steps related to the terminal device and described in embodiments of this application. The function, the unit, or the means may be implemented by software or hardware, may be implemented by hardware executing corresponding software, or may be implemented by a combination of software and hardware. For details, refer to the corresponding descriptions in the foregoing corresponding method embodiment. Alternatively, the apparatus has a function of implementing the network device described in embodiments of this application. For example, the apparatus includes a corresponding module, unit, or means used by the network device to perform the steps related to the network device and described in embodiments of this application. The function, the unit, or the means may be implemented by software or hardware, may be implemented by hardware executing corresponding software, or may be implemented by a combination of software and hardware. For details, refer to the corresponding descriptions in the foregoing corresponding method embodiment.

Optionally, the modules in the apparatus 1600 in this embodiment of this application may be configured to perform the method described in FIG. 8, FIG. 10, FIG. 12, or FIG. 13 in embodiments of this application, or may be configured to perform a method in which the methods described in the foregoing two or more figures are combined.

In a possible design, the apparatus 1600 may include the processing module 1602 and the transceiver module 1601.

Figures 10, 11:
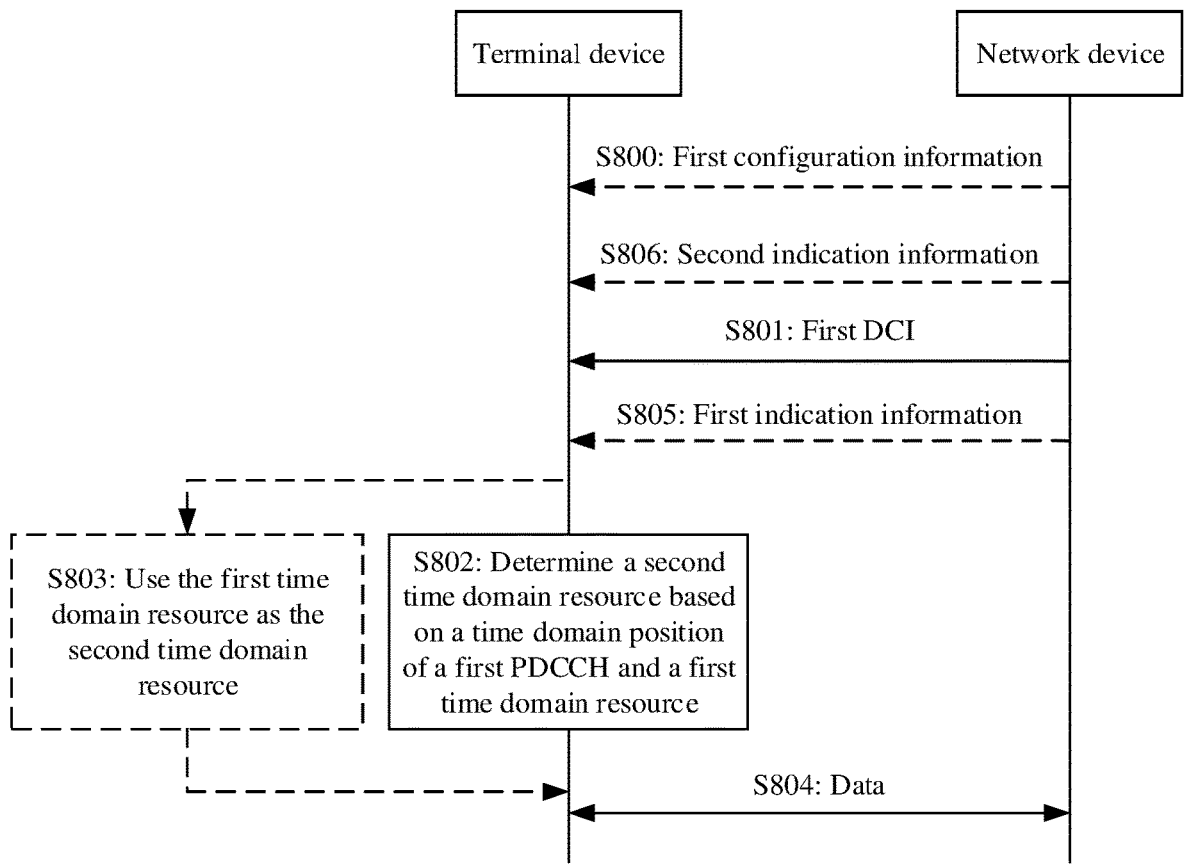
FIG. 10 is a schematic flowchart of another communication method according to an embodiment of this application.
FIG. 11 is a schematic diagram of a structure of a media access control layer message according to an embodiment of this application.

For example, the communication apparatus 1600 is the terminal device in FIG. 8 or FIG. 10 in the foregoing method embodiment.

The transceiver module 1601 is configured to receive first downlink control information DCI from a network device through a first physical downlink control channel PDCCH, where the first DCI includes a first time domain resource assignment TDRA indicator field, and the first TDRA indicator field is used to indicate a first time domain resource.

The processing module 1602 is configured to determine a second time domain resource based on a time domain position of the first PDCCH and the first time domain resource, where the first time domain resource is different from the second time domain resource.

The transceiver module 1601 is further configured to receive or send data on the second time domain resource.

In a possible design, that the processing module 1602 is configured to determine a second time domain resource based on a time domain position of the first PDCCH and the first time domain resource includes: The processing module 1602 is configured to determine the second time domain resource based on an end symbol position of the first PDCCH when the end symbol position of the first PDCCH overlaps the first time domain resource.

In a possible design, there is an offset between a start symbol position of the second time domain resource and the end symbol position of the first PDCCH.

In a possible design, a unit of a value of the offset is a symbol, and the value of the offset is an integer greater than zero.

In a possible design, an allocation length of the second time domain resource is less than or equal to an allocation length of the first time domain resource.

In a possible design, the transceiver module 1601 is further configured to receive first indication information from the network device.

That the processing module 1602 is configured to determine a second time domain resource based on a time domain position of the first PDCCH and the first time domain resource includes: The processing module 1602 is configured to determine the second time domain resource based on the first indication information, the time domain position of the first PDCCH, and the first time domain resource.

In a possible design, the transceiver module 1601 is further configured to receive first configuration information from the network device, where the first configuration information is used to configure a plurality of search spaces.

The transceiver module 1601 is further configured to receive second indication information from the network device, where the second indication information indicates at least one search space in the plurality of search spaces.

That the transceiver module 1601 is configured to receive first DCI from a network device through a first PDCCH includes: The transceiver module 1601 is configured to receive the first DCI from the network device through the first PDCCH in the at least one search space.

In a possible design, the second indication information further indicates information about a serving cell and/or information about a bandwidth part BWP.

Figure 12:
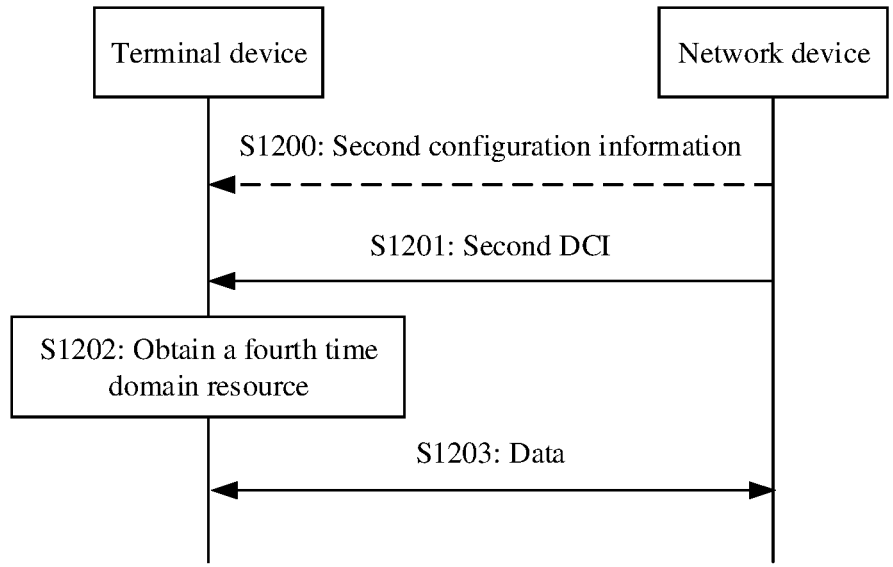
FIG. 12 is a schematic flowchart of another communication method according to an embodiment of this application.

For example, the communication apparatus 1600 is the terminal device in FIG. 12 or FIG. 13 in the foregoing method embodiment.

The transceiver module 1601 is configured to receive second downlink control information DCI from a network device through a second physical downlink control channel PDCCH, where the second DCI includes a second time domain resource assignment TDRA indicator field, and a value indicated by the second TDRA indicator field corresponds to a plurality of third time domain resources.

The processing module 1602 is configured to obtain a fourth time domain resource, where there is a correspondence between the fourth time domain resource and a time domain position of the second PDCCH, and the fourth time domain resource is one of the plurality of third time domain resources.

The transceiver module 1601 is further configured to receive or send data on the fourth time domain resource.

In a possible design, the transceiver module 1601 is further configured to receive third indication information from the network device.

That the processing module 1602 is configured to obtain a fourth time domain resource includes: The processing module 1602 is configured to obtain, based on the third indication information and the time domain position of the second PDCCH, the fourth time domain resource indicated by the second TDRA indicator field.

In a possible design, the transceiver module 1601 is further configured to receive second configuration information from the network device, where the second configuration information is used to configure a plurality of search spaces.

The transceiver module 1601 is further configured to receive fourth indication information from the network device, where the fourth indication information indicates at least one search space in the plurality of search spaces.

That the transceiver module 1601 is configured to receive second DCI from a network device through a second PDCCH includes: The transceiver module 1601 is configured to receive the second DCI from the network device through the second PDCCH in the at least one search space.

In a possible design, the fourth indication information further indicates information about a serving cell and/or information about a bandwidth part BWP.

For example, the communication apparatus 1600 is the network device in FIG. 8 or FIG. 10 in the foregoing method embodiment.

The transceiver module 1601 is configured to send first downlink control information DCI to a terminal device through a first physical downlink control channel PDCCH, where the first DCI includes a first time domain resource assignment TDRA indicator field, the first TDRA indicator field is used to indicate a first time domain resource, a time domain position of the first PDCCH and the first time domain resource are used to determine a second time domain resource, and the first time domain resource is different from the second time domain resource.

The transceiver module 1601 is further configured to send data on the second time domain resource; or the transceiver module 1601 is configured to receive data on the second time domain resource.

In a possible design, an end symbol position of the first PDCCH overlaps the first time domain resource.

In a possible design, there is an offset between a start symbol position of the second time domain resource and the end symbol position of the first PDCCH.

In a possible design, a unit of a value of the offset is a symbol, and the value of the offset is an integer greater than zero.

In a possible design, an allocation length of the second time domain resource is less than or equal to an allocation length of the first time domain resource.

In a possible design, the transceiver module 1601 is further configured to send first indication information to the terminal device, where the first indication information is used to indicate to determine the second time domain resource based on the time domain position of the first PDCCH and the first time domain resource.

In a possible design, the transceiver module 1601 is further configured to send first configuration information to the terminal device, where the first configuration information is used to configure a plurality of search spaces.

The transceiver module 1601 is further configured to send second indication information to the terminal device, where the second indication information indicates at least one search space in the plurality of search spaces.

That the transceiver module 1601 is configured to send first DCI to a terminal device through a first PDCCH includes: The transceiver module 1601 is configured to send the first DCI to the terminal device through the first PDCCH in the at least one search space.

In a possible design, the second indication information further indicates information about a serving cell and/or information about a bandwidth part BWP.

For example, the communication apparatus 1600 is the network device in FIG. 12 or FIG. 13 in the foregoing method embodiment.

The transceiver module 1601 is configured to send second downlink control information DCI to a terminal device through a second physical downlink control channel PDCCH, where the second DCI includes a second time domain resource assignment TDRA indicator field, a value indicated by the second TDRA indicator field corresponds to a plurality of third time domain resources, a time domain position of the second PDCCH is used to determine a fourth time domain resource, and the fourth time domain resource is one of the plurality of third time domain resources.

The transceiver module 1601 is further configured to send data on the fourth time domain resource; or the transceiver module 1601 is configured to receive data on the fourth time domain resource.

In a possible design, the transceiver module 1601 is further configured to send third indication information to the terminal device, where the third indication information is used to indicate to determine the fourth time domain resource based on the time domain position of the second PDCCH.

In a possible design, the transceiver module 1601 is further configured to send second configuration information to the terminal device, where the second configuration information is used to configure a plurality of search spaces.

The transceiver module 1601 is further configured to send fourth indication information to the terminal device, where the fourth indication information indicates at least one search space in the plurality of search spaces.

That the transceiver module 1601 is configured to send second DCI to a terminal device through a second PDCCH includes: The transceiver module 1601 is configured to send the second DCI to the terminal device through the second PDCCH in the at least one search space.

In a possible design, the fourth indication information further indicates information about a serving cell and/or information about a bandwidth part BWP.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

A person skilled in the art may further understand that various illustrative logical blocks (illustrative logical blocks) and steps that are listed in embodiments of this application may be implemented by using electronic hardware, computer software, or a combination thereof. Whether the functions are implemented by using hardware or software depends on particular applications and a design requirement of the entire system. A person skilled in the art may use various methods to implement the functions for corresponding application, but it should not be considered that the implementation goes beyond the protection scope of embodiments of this application.

It may be understood that, the processor in embodiments of this application may be an integrated circuit chip, and has a signal processing capability. In the implementation process, the steps in the foregoing method embodiment may be completed by using a hardware integrated logic circuit in the processor or by using instructions in a form of software. The foregoing processor may be a general-purpose processor, a digital signal processor (DSP), an application specific integrated circuit (ASIC), a field programmable gate array (FPGA) or another programmable logic device, a discrete gate or a transistor logic device, or a discrete hardware component.

The solutions described in this application may be implemented in various manners. For example, the technologies may be implemented by hardware, software, or a combination thereof. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA or another programmable logic apparatus, a discrete gate or transistor logic, a discrete hardware component, or any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

It may be understood that the memory in embodiments of this application may be a transitory memory or a non-transitory memory, or may include both the transitory memory and the non-transitory memory. The non-transitory memory may be a read-only memory (ROM), a programmable read-only memory (PROM), an erasable programmable read-only memory (EPROM), an electrically erasable programmable read-only memory (EEPROM), or a flash memory. The transitory memory may be a random access memory (RAM) and is used as an external high-speed cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memories in the system and method described in this specification include but are not limited to these memories and any memory of another suitable type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It may be understood that "an embodiment" mentioned in the entire specification means that particular features, structures, or characteristics related to the embodiment are included in at least one embodiment of this application. Therefore, embodiments in the entire specification do not necessarily refer to a same embodiment. Moreover, the particular features, structures, or characteristics may be combined in one or more embodiments in any proper manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It may be understood that, in this application, "when" and "if" mean that an apparatus performs corresponding processing in an objective situation, but do not constitute a limitation on time, do not require that the apparatus have a determining action during implementation, and do not mean any other limitation.

"Simultaneously" in this application may be understood as being at a same time point, may be understood as being within a time period, or may be understood as being within a same periodicity.

A person skilled in the art may understand that first, second, and various reference numerals in this application are for distinguishing only for ease of description, and are not used to limit the scope of embodiments of this application. A specific value of a numeral (which may also be referred to as an index), a specific value of a quantity, and a position in this application are merely used as an example, but are not unique representation forms, and are not used to limit the scope of embodiments of this application. First, second, and various reference numerals in this application are also for distinguishing only for ease of description, and are not used to limit the scope of embodiments of this application.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship between associated objects and represents that three relationships may exist. For example, A and/or B may represent the following three cases: only A exists, both A and B exist, and only B exists. A may be singular or plural, and B may be singular or plural. The character "/" generally indicates an "or" relationship between the associated objects.

The term "at least one of" in this specification indicates all or any combination of listed items. For example, "at least one of A, B, and C" may indicate the following six cases: A exists alone, B exists alone, C exists alone, A and B coexist, B and C coexist, and A, B, and C coexist. A may be singular or plural, B may be singular or plural, and C may be singular or plural.

It may be understood that in embodiments of this application, "B corresponding to A" indicates that B is associated with A, and B may be determined based on A. However, it should be further understood that determining B based on A does not mean that B is determined based only on A. That is, B may also be determined based on A and/or other information.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may understand that units and algorithm steps in the examples described with reference to embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person of ordinary skill in the art may understand that, for a purpose of convenient and brief descriptions, for a detailed working process of the foregoing system, apparatus, and units, refer to a corresponding process in the foregoing method embodiments. Details are not described herein again.

It may be understood that the system, apparatus, and method described in this application may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in electrical, mechanical, or another form.

The units described as separate parts may or may not be physically separate, and parts displayed as units may or may not be physical units, that is, may be located in one position, or may be distributed on a plurality of network units. Some or all of the units may be selected based on actual needs to achieve the objectives of the solutions of embodiments.

In addition, functional units in embodiments of this application may be integrated into one processing unit, each unit may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods in embodiments of this application. The foregoing storage medium includes: any medium that can store program code, such as a USB flash drive, a removable hard disk, a read-only memory (ROM), a random access memory (RAM), a magnetic disk, or a compact disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method according to an internal logical relationship thereof. The foregoing implementations of this application are not intended to limit the protection scope of this application.

The foregoing descriptions are merely specific implementations of this application, but the protection scope of this application is not limited thereto. Any variation or replacement readily figured out by a person skilled in the art within the technical scope disclosed in this application shall fall within the protection scope of this application.

What is claimed is:

1. A communication method, comprising:
   receiving first downlink control information (DCI) from a network device through a first physical downlink control channel (PDCCH), wherein the first DCI comprises a first time domain resource assignment (TDRA) indicator field, and the first TDRA indicator field indicates a first time domain resource;
   determining a second time domain resource based on a time domain position of the first PDCCH and the first time domain resource, wherein the first time domain resource is different from the second time domain resource, and wherein determining the second time domain resource based on the time domain position of the first PDCCH and the first time domain resource comprises:
   determining the second time domain resource based on an end symbol position of the first PDCCH when the end symbol position of the first PDCCH overlaps the first time domain resource; and
   receiving or sending data on the second time domain resource.

2. The method according to claim 1, wherein there is an offset between a start symbol position of the second time domain resource and the end symbol position of the first PDCCH.

3. The method according to claim 1, wherein an allocation length of the second time domain resource is less than or equal to an allocation length of the first time domain resource.

4. The method according to claim 1, further comprising:
   receiving first indication information from the network device; and
   wherein determining the second time domain resource based on the time domain position of the first PDCCH and the first time domain resource further comprises:
   determining the second time domain resource based on the first indication information, the time domain position of the first PDCCH, and the first time domain resource.

5. The method according to claim 1, further comprising:
   receiving first configuration information from the network device, wherein the first configuration information is used to configure a plurality of search spaces; and
   receiving second indication information from the network device, wherein the second indication information indicates at least one search space in the plurality of search spaces; and
   wherein receiving the first DCI from the network device through the first PDCCH comprises:
   receiving the first DCI from the network device through the first PDCCH in the at least one search space.

6. The method according to claim 5, wherein the second indication information further indicates at least one of information about a serving cell or information about a bandwidth part (BWP).

7. The method according to claim 5, wherein the second indication information further indicates information about a serving cell.

8. The method according to claim 1, wherein an allocation length of the second time domain resource is less than an allocation length of the first time domain resource.

9. The method according to claim 1, wherein an allocation length of the second time domain resource is equal to an allocation length of the first time domain resource.

10. An apparatus, comprising:
one or more processors; and
a non-transitory memory coupled to the one or more processors, wherein the non-transitory memory stores instructions to be executed by the one or more processors, and wherein the instructions, when executed by the one or more processors, instruct the one or more processors to perform operations comprising:
receiving first downlink control information (DCI) from a network device through a first physical downlink control channel (PDCCH), wherein the first DCI comprises a first time domain resource assignment (TDRA) indicator field, and the first TDRA indicator field indicates a first time domain resource;
determining a second time domain resource based on a time domain position of the first PDCCH and the first time domain resource, wherein the first time domain resource is different from the second time domain resource, and wherein determining the second time domain resource based on the time domain position of the first PDCCH and the first time domain resource comprises:
determining the second time domain resource based on an end symbol position of the first PDCCH when the end symbol position of the first PDCCH overlaps the first time domain resource; and
receiving or sending data on the second time domain resource.

11. The apparatus according to claim 10, wherein there is an offset between a start symbol position of the second time domain resource and the end symbol position of the first PDCCH.

12. The apparatus according to claim 10, wherein an allocation length of the second time domain resource is less than or equal to an allocation length of the first time domain resource.

13. The apparatus according to claim 10, wherein the non-transitory memory further stores instructions for receiving first indication information from the network device; and
wherein determining the second time domain resource based on the time domain position of the first PDCCH and the first time domain resource further comprises:
determining the second time domain resource based on the first indication information, the time domain position of the first PDCCH, and the first time domain resource.

14. The apparatus according to claim 10, wherein the non-transitory memory further stores instructions for:
receiving first configuration information from the network device, wherein the first configuration information is used to configure a plurality of search spaces; and
receiving second indication information from the network device, wherein the second indication information indicates at least one search space in the plurality of search spaces; and
wherein receiving the first DCI from the network device through the first PDCCH comprises:
receiving the first DCI from the network device through the first PDCCH in the at least one search space.

15. The apparatus according to claim 14, wherein the second indication information further indicates at least one of information about a serving cell or information about a bandwidth part (BWP).

16. A non-transitory computer readable medium storing instructions that, when executed by one or more processors, instructs the one or more processors to perform operations comprising:
receiving first downlink control information (DCI) from a network device through a first physical downlink control channel (PDCCH), wherein the first DCI comprises a first time domain resource assignment (TDRA) indicator field, and the first TDRA indicator field indicates a first time domain resource;
determining a second time domain resource based on a time domain position of the first PDCCH and the first time domain resource, wherein the first time domain resource is different from the second time domain resource, and wherein determining the second time domain resource based on the time domain position of the first PDCCH and the first time domain resource comprises:
determining the second time domain resource based on an end symbol position of the first PDCCH when the end symbol position of the first PDCCH overlaps the first time domain resource; and
receiving or sending data on the second time domain resource.

17. The non-transitory computer readable medium according to claim 16, wherein an allocation length of the second time domain resource is less than or equal to an allocation length of the first time domain resource.

18. The non-transitory computer readable medium according to claim 16, wherein the non-transitory computer readable medium further stores instructions for receiving first indication information from the network device; and
wherein determining the second time domain resource based on the time domain position of the first PDCCH and the first time domain resource further comprises:
determining the second time domain resource based on the first indication information, the time domain position of the first PDCCH, and the first time domain resource.

19. The non-transitory computer readable medium according to claim 16, wherein the non-transitory computer readable medium further stores instructions for:
receiving first configuration information from the network device, wherein the first configuration information is used to configure a plurality of search spaces; and
receiving second indication information from the network device, wherein the second indication information indicates at least one search space in the plurality of search spaces; and
wherein receiving the first DCI from the network device through the first PDCCH comprises:
receiving the first DCI from the network device through the first PDCCH in the at least one search space.

20. The non-transitory computer readable medium according to claim 19, wherein the second indication information further indicates at least one of information about a serving cell or information about a bandwidth part (BWP).

* * * * *